US011418383B2

(12) United States Patent
Chou

(10) Patent No.: US 11,418,383 B2
(45) Date of Patent: *Aug. 16, 2022

(54) TECHNIQUES FOR INSTANTIATION AND TERMINATION OF VIRTUALIZED NETWORK FUNCTIONS

(71) Applicant: APPLE INC., Cupertino, CA (US)

(72) Inventor: Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/060,910

(22) PCT Filed: Oct. 1, 2016

(86) PCT No.: PCT/US2016/055070
§ 371 (c)(1),
(2) Date: Jun. 8, 2018

(87) PCT Pub. No.: WO2017/119932
PCT Pub. Date: Jul. 13, 2017

(65) Prior Publication Data
US 2018/0367372 A1    Dec. 20, 2018

Related U.S. Application Data

(60) Provisional application No. 62/276,527, filed on Jan. 8, 2016, provisional application No. 62/276,489, filed on Jan. 8, 2016.

(51) Int. Cl.
*H04L 41/0813* (2022.01)
*H04L 41/0654* (2022.01)
(Continued)

(52) U.S. Cl.
CPC ...... *H04L 41/0672* (2013.01); *H04L 41/0631* (2013.01); *H04L 41/0681* (2013.01); *H04L 41/5009* (2013.01); *H04L 43/16* (2013.01)

(58) Field of Classification Search
CPC ..... H04L 41/0681; H04L 12/24; H04L 43/16; H04L 41/0672; H04L 41/5009;
(Continued)

(56) References Cited

U.S. PATENT DOCUMENTS 9,807,630 B2 * 10/2017 Zhang ................. H04W 24/08
10,595,190 B2 * 3/2020 Chou ..................... H04W 8/12
(Continued)

FOREIGN PATENT DOCUMENTS

CN       103298046 A      9/2013
WO    2015106822 A1      7/2015

OTHER PUBLICATIONS

International Search Report for the International Application No. PCT/US16/55070, dated Jan. 4, 2017, 3 pages.
(Continued)

*Primary Examiner* — Hanh N Nguyen
(74) *Attorney, Agent, or Firm* — Eschweiler & Potashnik, LLC

(57) ABSTRACT

Techniques for instantiation and termination of virtualized network functions are described. In one embodiment, for example, an apparatus may comprise processing circuitry and computer-readable storage media having stored thereon instructions for execution by the processing circuitry to identify, based on a first message received from an integration reference point manager (IRPManager), a virtualized network function (VNF) instance to be terminated, send a VNF termination request to a virtualized network functions manager (VNFM) to request termination of the VNF instance, determine a VNF instance termination result for the VNF termination request based on a notification received from the VNFM, and send a second message to the IRP-
(Continued)

Manager, the second message to indicate the VNF instance termination result. Other embodiments are described and claimed.

28 Claims, 17 Drawing Sheets

(51) Int. Cl.
  *H04L 41/5009* (2022.01)
  *H04L 43/16* (2022.01)
  *H04L 41/0681* (2022.01)
  *H04L 41/0631* (2022.01)

(58) Field of Classification Search
  CPC ......... H04L 12/46; H04L 29/08; H04L 67/10; H04L 41/5012; H04L 41/12; H04L 41/0806; H04L 41/0654; H04L 43/0817; H04L 41/0631; G06F 9/485; G06F 9/5077; G06F 9/455; G06F 11/1438; H04W 28/08; H04W 24/08; H04W 72/04
  See application file for complete search history.

(56) References Cited

U.S. PATENT DOCUMENTS

| | | | |
|---|---|---|---|
| 10,728,054 B2* | 7/2020 | Yu | H04L 67/10 |
| 2017/0150399 A1* | 5/2017 | Kedalagudde | H04L 43/16 |
| 2017/0257276 A1* | 9/2017 | Chou | H04W 24/02 |
| 2018/0011730 A1* | 1/2018 | Zembutsu | G06F 9/45558 |
| 2018/0206108 A1* | 7/2018 | Chou | H04W 28/08 |
| 2018/0253332 A1* | 9/2018 | Andrianov | H04L 41/064 |
| 2018/0367373 A1* | 12/2018 | Chou | H04L 41/0631 |
| 2019/0073269 A1* | 3/2019 | Chou | H04L 41/0654 |

OTHER PUBLICATIONS

"Network Function Virtualization (NFV) Management and Orchestration; GS NFV-Man 001", ETSI Draft; GS NFV-MAN 001, European Telecommunications Standards Institute (ETSI), 650, Route Des Lucioles; F-06921 Sophia-Antipolis; France, vol. ISG-NFV, No. Vo. 6.3, Sep. 22, 2014 (Sep. 22, 2014), pp. 1-197, XP014216374, [retreived on Sep. 22, 2014] pp. 128-129, paragraph B.5.

Network Functions Virtualisation (NFV); Management and Orchestration; ETSI GS NFV-MAN 001 V1.1.1 (Dec. 2014). Sec. 5.5; pp. 127-129.

Nokia Networks; "Add Specification Level UCs and Requirements for VNF Termination"; 3GPP TSG SA WG4 Telecom Management Meeting #104 S5-156165.

Ericsson; "Introduction of VNFs In Mobile Networks"; 3GPP TSG-SA5 Meeting #103 S5-156266.

Huawei; "Adding VNF Instantiation use cases and specification level requirements"; 3GPP TSG SA WG5 Telecom Management Meeting #103 S5-155107.

3rd Generation Partnership Project; Technical Specification Group Services and System Aspects; Telecommunication management; Management concept, architecture and requirements for mobile networks that include virtualized network functions; (Release 14); 3GPP TS 28.500 V0.3.0; Nov. 2015.

3rd Generation Partnership Project; Technical Specification Group Services and System Aspects; Study on Machine-Type Communications (MTC) and other mobile data applications communications enhancements; (Release 12); 3GPP TR 23.887 V12.0.0; Dec. 2013.

3rd Generation Partnership Project Technical Specification Group Services and System Aspects; Telecommunication management; Life Cycle Management (LCM) for mobile networks that include virtualized network functions; Requirements; (Release 14); 3GPP TS 28.525 V0.2.0; Nov. 2015.

Digital cellular telecommunications system (Phase 2+) (GSM); Universal Mobile Telecommunications System (UMTS); LTE; Service requirements for Machine-Type Communications (MTC) Stage 1; 3GPP TS 22.368 version 13.1.0 Release 13; ETSI TS 122 368 V13.1.0; Mar. 2016.

Digital cellular telecommunications system (Phase 2+) (GSM); Universal Mobile Telecommunications System (UMTS); LTE; Architecture enhancements to facilitate communications with packet data networks and applications; 3GPP TS 23.682 version 13.4.0; Release 13; ETSI TS 123 682 v13.4.0; Dec. 2016.

3rd Generation Partnership Project; Technical Specification Group Services and System Aspects; Telecommunication management; Management concept, architecture and requirements for mobile networks that include virtualized network functions (Release 14); 3GPP TS 28.500 V0.4.0; Jan. 2016.

IEEE Standard 802.16: A Technical Overview of the Wireless-MAN™ Air Interface for Broadband Wireless Access; IEEE 802.16 Broadband Wireless Access Working Group; http://ieee802.org/16.

* cited by examiner

*800*

*1500*

TECHNIQUES FOR INSTANTIATION AND TERMINATION OF VIRTUALIZED NETWORK FUNCTIONS

CROSS-REFERENCE TO RELATED APPLICATION CASE

This application is a national phase claiming the benefit of and priority to International Patent Application No. PCT/US2016/055070, filed Oct. 1, 2016, which claims priority to U.S. Provisional Patent Application No. 62/276,527, filed Jan. 8, 2016, and U.S. Provisional Patent Application No. 62/276,489, filed Jan. 8, 2016, all of which are hereby incorporated by reference in their entireties.

TECHNICAL FIELD

Embodiments herein generally relate to the virtualization of nodes in communication networks.

BACKGROUND

In order to enhance the ability of a communication network to dynamically adapt to changes in network conditions, it may be desirable to implement a virtualization framework, which may enable the virtualization of one or more entities/nodes of that communication network. In the context of a 3rd Generation Partnership Project (3GPP) network, the implementation of a virtualization framework may enable the virtualization of various types of network elements, which may potentially include core network entities such as mobility management entities (MMEs), serving gateways (GWs), and packet data network (PDN) GWs and/or radio access network (RAN) entities such as evolved node Bs (eNBs). One example of a virtualization framework that may be implemented in order to enable the virtualization of network elements in a 3GPP network is the Network Functions Virtualization (NFV) framework defined by various group specifications (GSs) that are currently being developed by the NFV Industry Specification Group (ISG) of the European Telecommunications Standards Institute (ETSI).

DETAILED DESCRIPTION

Figure 1:
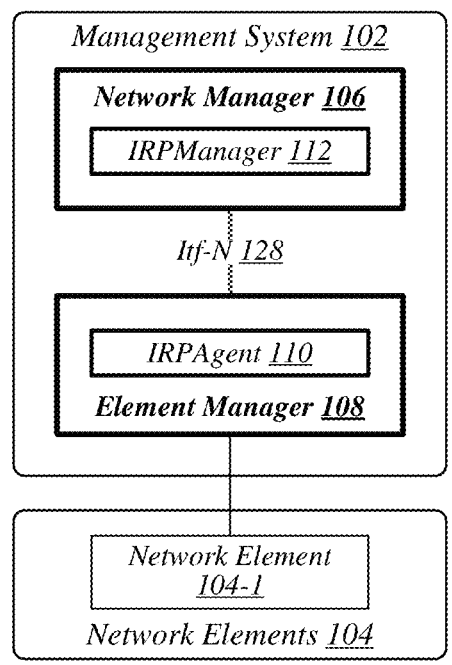
FIG. 1 illustrates an embodiment of a communications network.

Various embodiments may be generally directed to techniques for instantiation and termination of virtualized network functions. In one embodiment, for example, an apparatus may comprise processing circuitry and computer-readable storage media having stored thereon instructions for execution by the processing circuitry to identify, based on a first message received from an integration reference point manager (IRPManager), a virtualized network function (VNF) instance to be terminated, send a VNF termination request to a virtualized network functions manager (VNFM) to request termination of the VNF instance, determine a VNF instance termination result for the VNF termination request based on a notification received from the VNFM, and send a second message to the IRPManager, the second message to indicate the VNF instance termination result. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile m Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of a basic high-level system architecture of a 3GPP network 100 that may be representative of various embodiments. As reflected in FIG. 1, 3GPP network 100 may be implemented by configuring a management system 102 to manage a set of network elements 104. Network elements 104 may generally comprise various types of functional nodes possessing capabilities that collectively enable the provision of mobile services to end users. Examples of network elements 104 may include evolved node Bs (eNBs), mobility management m entities (MMEs), serving gateways (GWs), packet data network (PDN) GWs, evolved packet gateways, local GWs, evolved packet data GWs (ePDGs), home subscriber servers (HSSs), 3GPP authentication, authorization, and accounting (AAA) servers, and access network discovery and selection function (ANDSF) entities. The embodiments are not limited to these examples.

Management system 102 may comprise a network manager 106. Network manager 106 may generally comprise an entity responsible for performing high-level oversight/management of the set of network elements 104 in such fashion as to enable 3GPP network 100 to operate appropriately according to establish parameters. In some embodiments, network manager 106 may be provided with managerial access to some or all of network elements 104 via one or more element managers 108. Each such element manager 108 may generally comprise an entity that is response for controlling/managing one or more particular network elements among the set of network elements 104 of 3GPP network 100.

In the example depicted in FIG. 1, network manager 106 is provided with managerial access to a network element 104-1 via an element manager 108. In various embodiments, network manager 106 and element manager 108 may be configured to communicate with each other via an Itf-N interface 128. In some embodiments, element manager 108 may act as an Integration Reference Point (IRP) agent (IRPAgent) 110. In various embodiments, in conjunction with acting as IRPAgent 110, element manager 108 may provide one or more IRPs that are usable by network manager 106 to interact with element manager 108 in a fashion enabling managerial control over network element 104-1. In some embodiments, in order to make use of those IRPs to interact with element manager 108, network manager 106 may act as an IRP manager (IRPManager) 112. It is worthy of note that although FIG. 1 depicts IRPAgent 110 and IRPManager 112 as boxes within element manager 108 and network manager 106, respectively, this depiction is not intended to indicate that IRPAgent 110 and IRPManager 112 need necessarily constitute discrete components of element manager 108 and network manager 106. Rather, this depiction is merely intended to indicate that in various embodiments, network manager 106 and element manager 108 may operate in such fashion as to act as IRPManager 112 and IRPAgent 110, respectively. The embodiments are not limited in this context.

Figure 2:
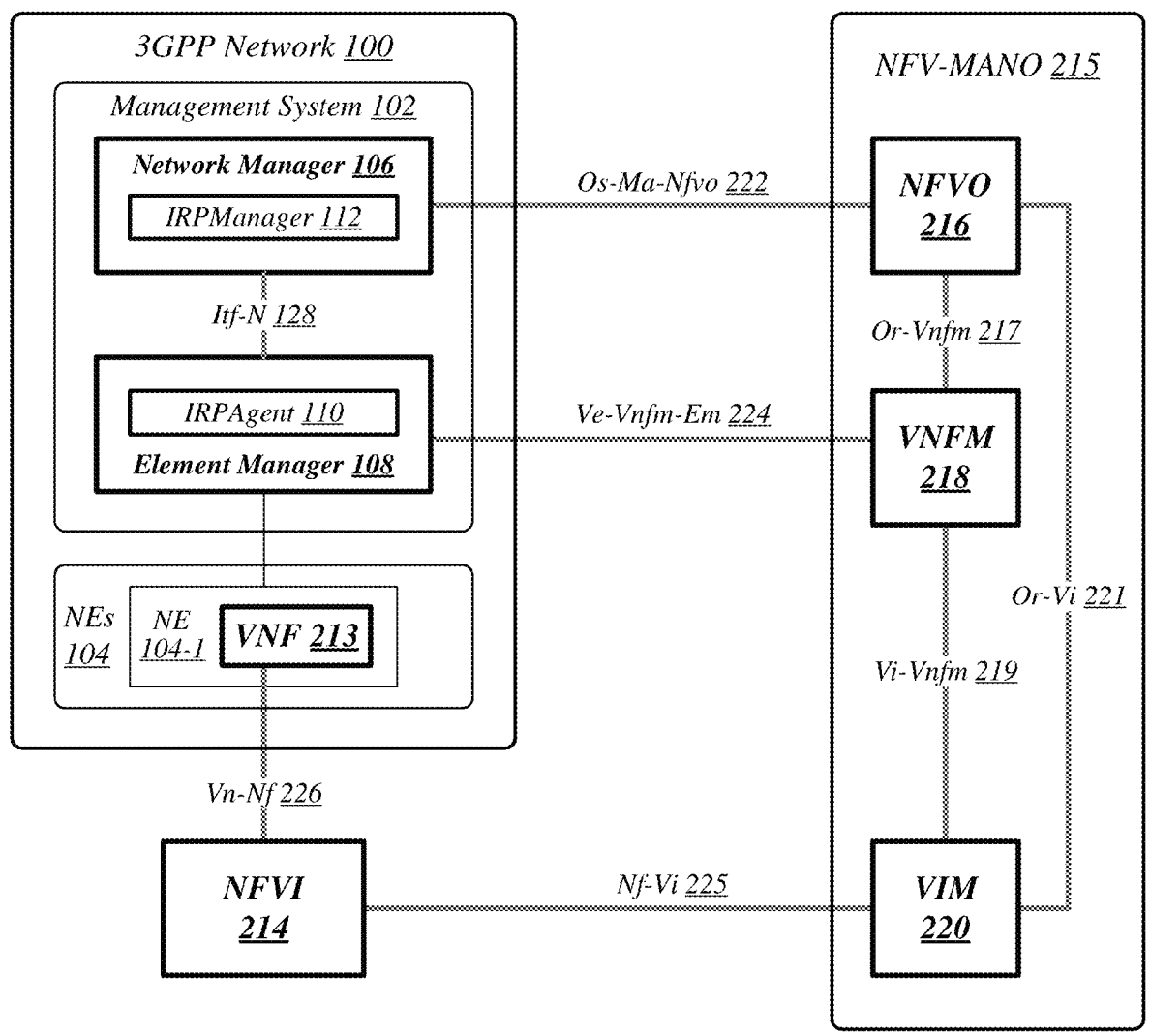
FIG. 2 illustrates an embodiment of a management architecture.

In various embodiments, due to a variety of potential factors, the numbers and/or types of network elements that are actually required to enable appropriate operation of 3GPP network 100 may tend to fluctuate over time. As such, it may be desirable that network function virtualization techniques be implemented for 3GPP network 100, such that the composition of the set of network elements 104 can be dynamically altered to adapt to changes in the demands placed on the system. FIG. 2 illustrates an example of a Network Functions Virtualization (NFV) management architecture 200 that may support the implementation of network function virtualization in 3GPP network 100 according to some embodiments. As shown in FIG. 2, NFV management architecture 200 may feature an NFV Infrastructure (NFVI) 214 and NFV Management and Orchestration (NFV-MANO) 215. NFVI 214 may generally comprise a pool of virtual resources—such as virtual computing, storage, and networking resources—that is defined by the application of one or more abstraction layers to a pool of hardware resources, such as computing hardware, storage hardware, and networking hardware resources. NFV-MANO 215 may generally comprise a set of entities that collectively facilitate life-cycle management, including instantiation and termination, of virtualized network functions (VNFs) supported by virtual resources provided by NFVI 214. In the example depicted in FIG. 2, virtual resources of NFVI 214 are allocated for a VNF 213, which is used to implement network element 104-1. The embodiments are not limited to this example.

In various embodiments, NFV-MANO 215 may comprise NFV Orchestrator (NFVO) 216. NFVO 216 may generally comprise an entity responsible for performing high-level oversight/management of the use of virtual resources of NFVI 214 to support virtualized network functions—such as VNF 213—that are utilized to implement network elements of 3GPP network 100. In some embodiments, NFV-MANO 215 may include a Virtualized Network Functions Manager (VNFM) 218 that generally comprises an entity particularly responsible for management of VNF 213. In various embodiments, VNFM 218 may only be responsible for managing VNF 213. In some other embodiments, VNFM 218 may be responsible for managing one or more other VNFs (not pictured) in addition to VNF 213. In various embodiments, VNFM 218 and NFVO 216 may be configured to communicate with each other via an Or-Vnfm interface 217. In some embodiments, NFV-MANO 215 may comprise Virtualized Infrastructure Manager (VIM) 220. VIM 220 may generally comprise an entity responsible for control and management of virtual resources of NFVI 214. In various embodiments, VIM 220 and VNFM 218 may be configured to communicate with each other via a Vi-Vnfm interface 219. In some embodiments, VIM 220 and NFVO 216 may be configured to communicate with each other via an Or-Vi interface 221.

In various embodiments, network manager 106 and NFVO 216 may be configured to communicate with each other via an Os-Ma-Nfvo interface 222. In some embodiments, element manager 108 and VNFM 218 may be configured to communicate with each other via a Ve-Vnfm-Em interface 224. In various embodiments, NFVI 214 and VIM 220 may be configured to communicate with each other via an Nf-Vi interface 225. In some embodiments, VNF 213 and NFVI 214 may be configured to communicate with each other via a Vn-Nf interface 226.

Figure 3:
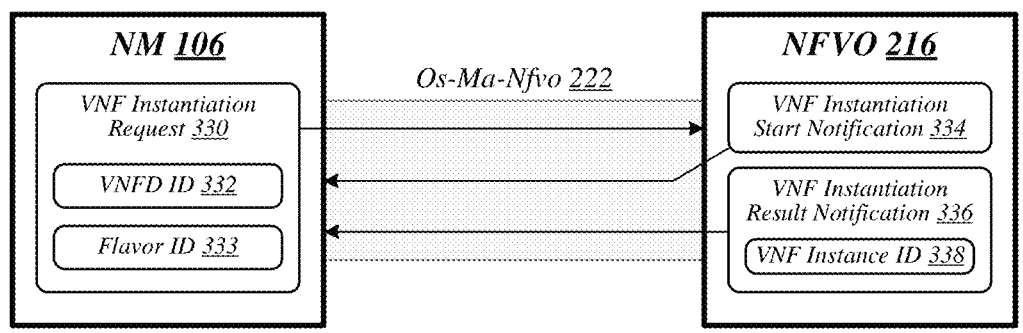
FIG. 3 illustrates an embodiment of a first operating environment.

FIG. 3 illustrates an example of an operating environment 300 that may be representative of the implementation of one or more of the disclosed techniques according to various embodiments. More particularly, operating environment 300 may be representative of some embodiments in which the instantiation of a VNF such as VNF 213 of FIG. 2 is initiated via communication over an Os-Ma-Nfvo interface. In operating environment 300, network manager 106 may determine to instantiate a VNF instance for use as a network element in a network such as 3GPP network 100. Following this determination, network manager 106 may send a VNF instantiation request 330 to NFVO 216 via Os-Ma-Nfvo interface 222. In various embodiments, VNF instantiation request 330 may comprise a VNF descriptor (VNFD) identifier (ID) 332. VNFD ID 332 may comprise an identifier corresponding to a particular defined VNFD, which may generally constitute a deployment template that describes a set of deployment and operational behavior requirements to be satisfied by VNFs of a type associated with than VNFD. In some embodiments, network manager 106 may identify a suitable VNFD based on the type of network element that it intends to implement using the requested VNF, and may include an identifier associated with that VNFD within VNF instantiation request 330 as VNFD ID 332. In various embodiments, VNF instantiation request 330 may comprise a flavor ID 333. Flavor ID 333 may comprise an identifier corresponding to a particular "deployment flavor", which may generally define a required performance capacity for the requested VNF. In an example embodiment, network manager 106 may intend to implement a virtual evolved packet gateway (vEPG) using the requested VNF, and may select flavor ID 333 as one of a "high" value corresponding to a 500k packets/second capacity, a "medium" value corresponding to a 300k packets/second capacity, and a "low" value corresponding to a 100k packets/second capacity. The embodiments are not limited to this example.

In response to receipt of VNF instantiation request 330, NFVO 216 may initiate a VNF instantiation procedure in order to instantiate a VNF. In some embodiments, based on one or both of VNFD ID 332 and flavor ID 333, NFVO 216 may identify a suitable VNF package (including a VNF software image) for the requested VNF instance, and may determine appropriate types and amounts of virtual resources to be allocated for the requested VNF instance. In various embodiments, NFVO 216 may notify network manager 106 that it has commenced the VNF instantiation procedure by sending a VNF instantiation start notification 334 to network manager 106 via Os-Ma-Nfvo interface 222. In some embodiments, upon successful completion of the VNF instantiation procedure, NFVO 216 may notify network manager 106 of the successful VNF instantiation by sending a VNF instantiation result notification 336 to network manager 106 via Os-Ma-Nfvo 222. In various embodiments, NFVO 216 may determine an identifier associated with the instantiated VNF, and may include that identifier in VNF instantiation result notification 336 as VNF instance ID 338. For example, if VNF 213 of FIG. 2 is instantiated via the VNF instantiation procedure, VNF instance ID 338 may comprise an identifier associated with VNF 213. In some embodiments, if the VNF instantiation procedure is not successfully completed, NFVO 216 may send VNF instantiation result notification 336 to network manager 106 to notify network manager 106 of the failed VNF instantiation. In various other embodiments, NFVO 216 may not send a notification to network manager 106 in the event of a failed VNF instantiation. In some such embodiments, network manager 106 may be configured to determine that the VNF instantiation has been successful when it receives a VNF instantiation result notification 336 from NFVO 216, and to determine that the VNF instantiation has failed when it does not receive VNF instantiation result notification 336 from NFVO 216. The embodiments are not limited in this context.

Figure 4:
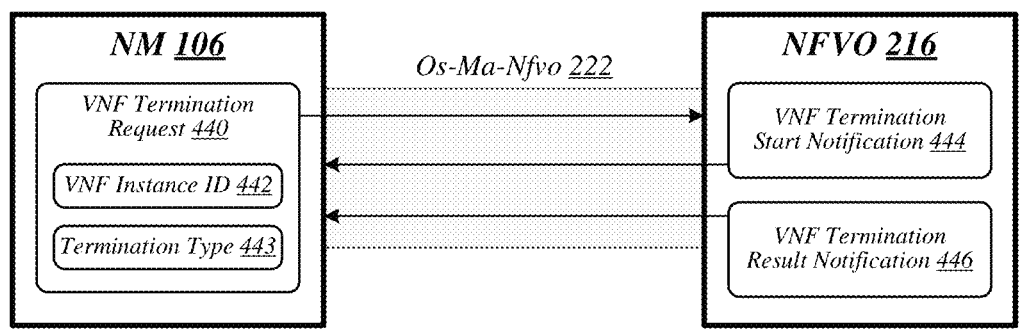
FIG. 4 illustrates an embodiment of a second operating environment.

FIG. 4 illustrates an example of an operating environment 400 that may be representative of the implementation of one or more of the disclosed techniques according to various embodiments. More particularly, operating environment 400 may be representative of some embodiments in which the termination of a VNF such as VNF 213 of FIG. 2 is initiated via communication over an Os-Ma-Nfvo interface. In operating environment 400, network manager 106 may determine to terminate a VNF instance. For example, network manager 106 may determine to terminate VNF 213 of FIG. 2. Following this determination, network manager 106 may send a VNF termination request 440 to NFVO 216 via Os-Ma-Nfvo interface 222. In various embodiments, network manager 106 may determine an identifier associated with the VNF instance to be terminated, and may include that identifier in VNF termination request 440 as VNF instance ID 442. For example, if VNF termination request 440 constitutes a request to terminate VNF 213 of FIG. 2, VNF instance ID 442 may comprise an identifier associated with VNF 213. In some embodiments, VNF termination request 440 may contain a termination type 443 comprising a value indicating that VNF termination request 440 constitutes a request to forcefully terminate the VNF instance. The embodiments are not limited in this context.

In response to receipt of VNF termination request 440, NFVO 216 may initiate a VNF termination procedure in order to terminate the appropriate VNF. In various embodiments, NFVO 216 may notify network manager 106 that it has commenced the VNF termination procedure by sending a VNF termination start notification 444 to network manager 106 via Os-Ma-Nfvo interface 222. In some embodiments, upon successful completion of the VNF termination procedure, NFVO 216 may notify network manager 106 of the successful VNF termination by sending a VNF termination result notification 446 to network manager 106 via Os-Ma-Nfvo interface 222. In various embodiments, if the VNF termination procedure is not successfully completed, NFVO 216 may send VNF termination result notification 446 to network manager 106 to notify network manager 106 of the failed VNF termination. In some other embodiments, NFVO 216 may not send a notification to network manager 106 in the event of a failed VNF termination. In various such embodiments, network manager 106 may be configured to determine that the VNF termination has been successful when it receives a VNF termination result notification 446 from NFVO 216, and to determine that the VNF termination has failed when it does not receive VNF termination result notification 446 from NFVO 216. The embodiments are not limited in this context.

Figure 5:
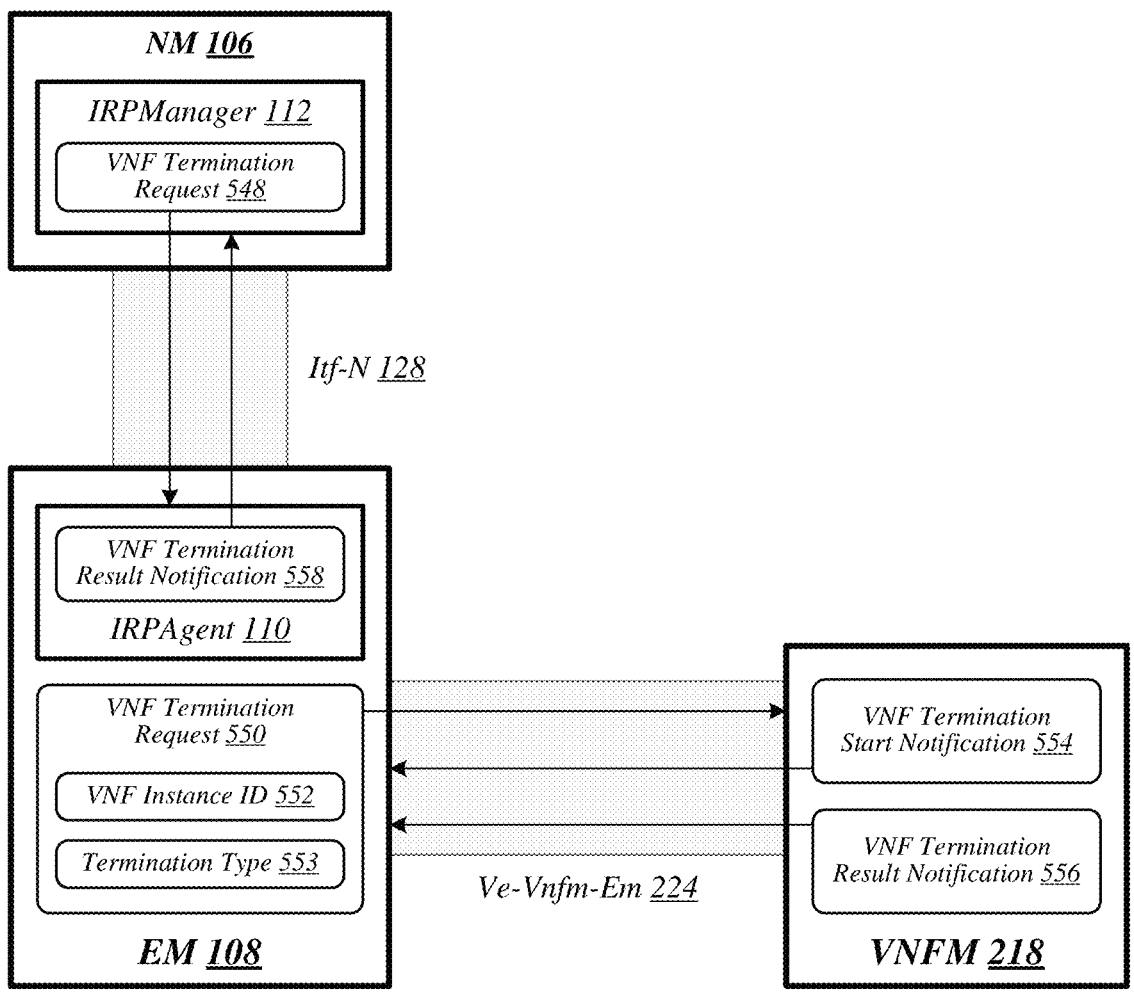
FIG. 5 illustrates an embodiment of a third operating environment.

FIG. 5 illustrates an example of an operating environment 500 that may be representative of the implementation of one or more of the disclosed techniques according to some embodiments. More particularly, operating environment 500 may be representative of various embodiments in which the termination of a VNF such as VNF 213 of FIG. 2 is initiated via communication over an Itf-N interface. In operating environment 500, network manager 106 may determine to terminate a VNF instance. For example, network manager 106 may determine to terminate VNF 213 of FIG. 2. Following this determination, network manager 106 may send a VNF termination request 548 to element manager 108 via Itf-N interface 128. In some embodiments, VNF termination request 548 may comprise an identifier associated with the VNF instance to be terminated. In various embodiments, network manager 106 may send VNF termination request 548 in conjunction with acting as IRPManager 112, and element manager 108 may receive VNF termination request 548 in conjunction with acting as IRPAgent 110. The embodiments are not limited in this context.

Based on the received VNF termination request 548, element manager 108 may identify the VNF instance to be terminated and may send a VNF termination request 550 to VNFM 218 via Ve-Vnfm-Em interface 224 in order to request termination of that VNF instance. In some embodiments, element manager 108 may determine an identifier associated with the VNF instance to be terminated, and may include that identifier in VNF termination request 550 as VNF instance ID 552. For example, if VNF termination request 550 constitutes a request to terminate VNF 213 of FIG. 2, VNF instance ID 552 may comprise an identifier associated with VNF 213. In various embodiments, VNF termination request 550 may contain a termination type 553 comprising a value indicating that VNF termination request 550 constitutes a request to forcefully terminate the VNF instance. The embodiments are not limited in this context.

In response to receipt of VNF termination request 550, VNFM 218 may initiate a VNF termination procedure in order to terminate the appropriate VNF. In some embodiments, VNFM 218 may notify element manager 108 that it has commenced the VNF termination procedure by sending a VNF termination start notification 554 to element manager 108 via Ve-Vnfm-Em interface 224. In various embodiments, VNFM 218 may send a VNF termination result notification 556 to element manager 108 via Ve-Vnfm-Em interface 224, and the VNF termination result notification 556 may indicate a result (e.g., success or failure) of the VNF instance termination. Based on VNF termination result notification 556, element manager 108 may determine a VNF instance termination result for VNF termination request 550. In some embodiments, element manager 108 may then return that VNF instance termination result to network manager 106 by sending a VNF termination result notification 558 to network manager 106 via Itf-N interface 128. Based on the received VNF termination result notification 558, network manager 106 may determine whether the VNF instance has been successfully terminated. In various embodiments, element manager 108 may send VNF termination result notification 558 in conjunction with acting as IRPAgent 110, and network manager 106 may receive VNF termination result notification 558 in conjunction with acting as IRPManager 112. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
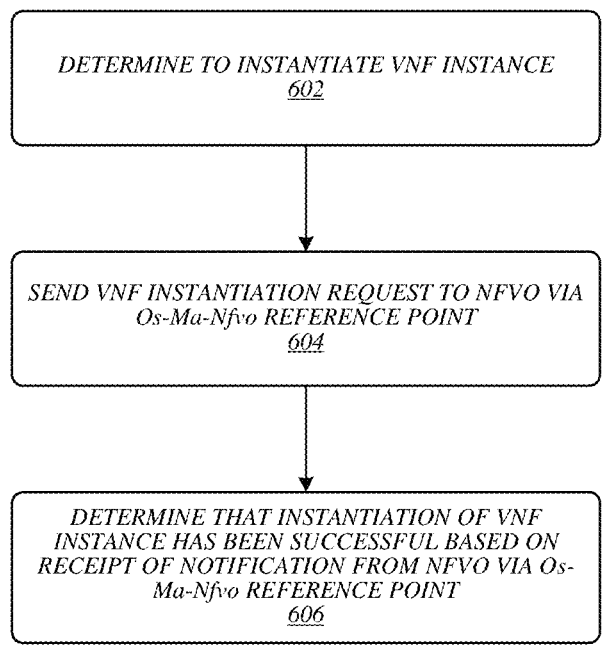
FIG. 6 illustrates an embodiment of a first logic flow.

FIG. 6 illustrates an example of a logic flow 600 that may be representative of the implementation of one or more of the disclosed techniques according to some embodiments. For example, logic flow 600 may be representative of operations that may be performed by network manager 106 in operating environment 300 of FIG. 3. As shown in FIG. 6, a determination may be made at 602 to instantiate a VNF instance. For example, in operating environment 300 of FIG. 3, network manager 106 may determine to instantiate a VNF instance. At 604, a VNF instantiation request may be sent to an NFVO via an Os-Ma-Nfvo reference point. For example, in operating environment 300 of FIG. 3, network manager 106 may send VNF instantiation request 330 to NFVO 216 via Os-Ma-Nfvo interface 222. At 606, based on receipt of a notification from the NFVO via the Os-Ma-Nfvo reference point, it may be determined that instantiation of the VNF instance has been successful. For example, in operating environment 300 of FIG. 3, network manager 106 may determine that VNF instantiation has been successful based on receipt of VNF instantiation result notification 336 from NFVO 216 via Os-Ma-Nfvo interface 222. The embodiments are not limited to these examples.

Figure 7:
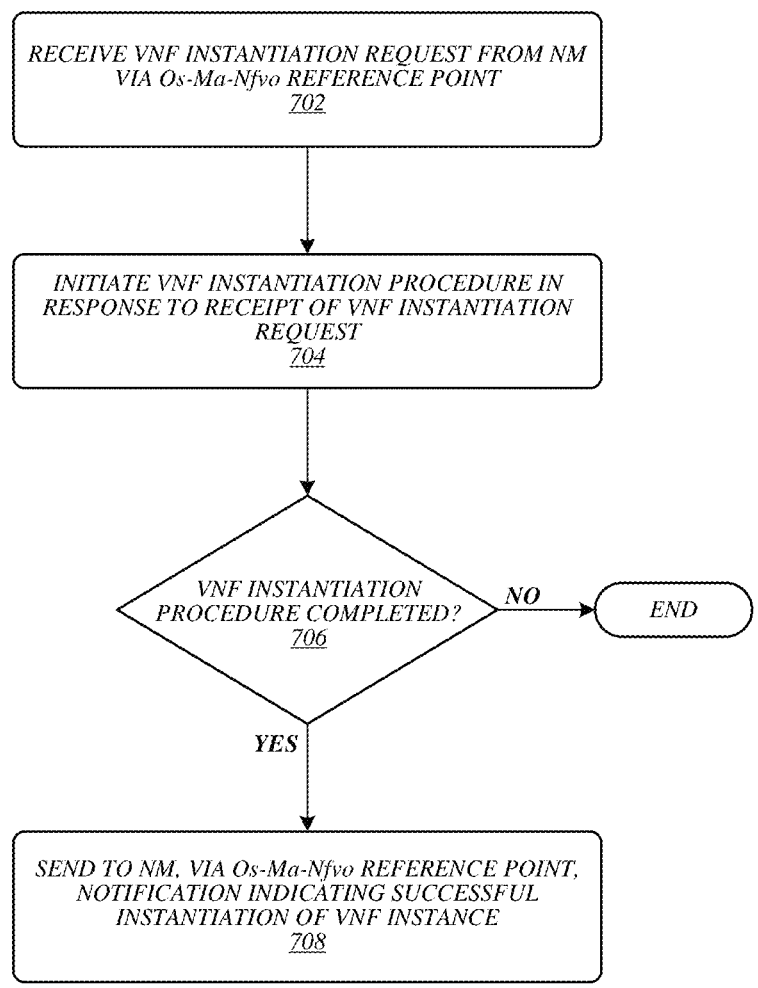
FIG. 7 illustrates an embodiment of a second logic flow.

FIG. 7 illustrates an example of a logic flow 700 that may be representative of the implementation of one or more of the disclosed techniques according to various embodiments. For example, logic flow 700 may be representative of operations that may be performed by NFVO 216 in operating environment 300 of FIG. 3. As shown in FIG. 7, a VNF instantiation request may be received from a network manager via an Os-Ma-Nfvo reference point at 702. For example, in operating environment 300 of FIG. 3, NFVO 216 may receive VNF instantiation request 330 from network manager 106 via Os-Ma-Nfvo interface 222. In response to receipt of the VNF instantiation request, a VNF instantiation procedure may be initiated at 704. For example, in operating environment 300 of FIG. 3, NFVO 216 may initiate a VNF instantiation procedure in response to receipt of VNF instantiation request 330. Following 704, flow may pass to 706, from which it may proceed in a manner that depends on whether the VNF instantiation procedure is successfully completed. If the VNF instantiation procedure is not successfully completed, the logic flow may end. If the VNF instantiation procedure is successfully completed, flow may pass to 708. At 708, a notification indicating the successful instantiation of the VNF instance may be sent to the network manager via the Os-Ma-Nfvo reference point. For example, in operating environment 300 of FIG. 3, NFVO 216 may send VNF instantiation result notification 336 to network manager 106 via Os-Ma-Nfvo interface 222. The embodiments are not limited to these examples.

Figure 8:
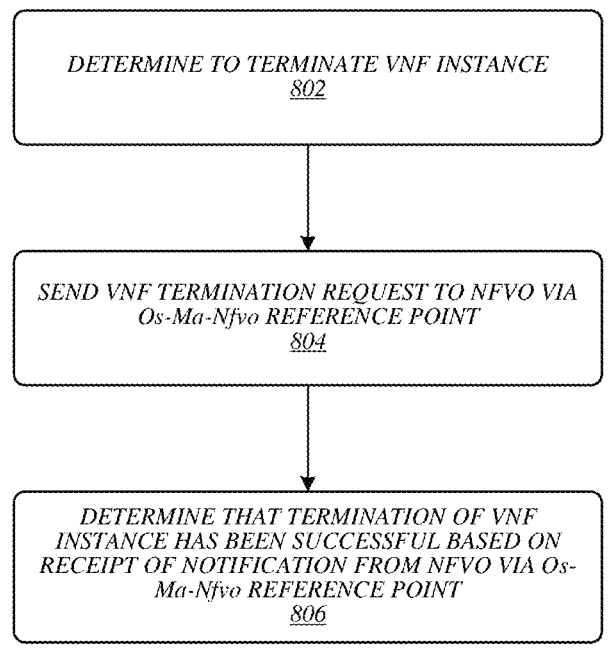
FIG. 8 illustrates an embodiment of a third logic flow.

FIG. 8 illustrates an example of a logic flow 800 that may be representative of the implementation of one or more of the disclosed techniques according to some embodiments. For example, logic flow 800 may be representative of operations that may be performed by network manager 106 in operating environment 400 of FIG. 4. As shown in FIG. 8, a determination may be made at 802 to terminate a VNF instance. For example, in operating environment 400 of FIG. 4, network manager 106 may determine to terminate VNF 213 of FIG. 2. At 804, a VNF termination request may be sent to an NFVO via an Os-Ma-Nfvo reference point. For example, in operating environment 400 of FIG. 4, network manager 106 may send VNF termination request 440 to NFVO 216 via Os-Ma-Nfvo interface 222. At 806, based on receipt of a notification from the NFVO via the Os-Ma-Nfvo reference point, it may be determined that termination of the VNF instance has been successful. For example, in operating environment 400 of FIG. 4, network manager 106 may determine that VNF 213 of FIG. 2 has been successfully terminated based on receipt of a VNF termination result notification 446 from NFVO 216 via Os-Ma-Nfvo interface 222. The embodiments are not limited to these examples.

Figure 9:
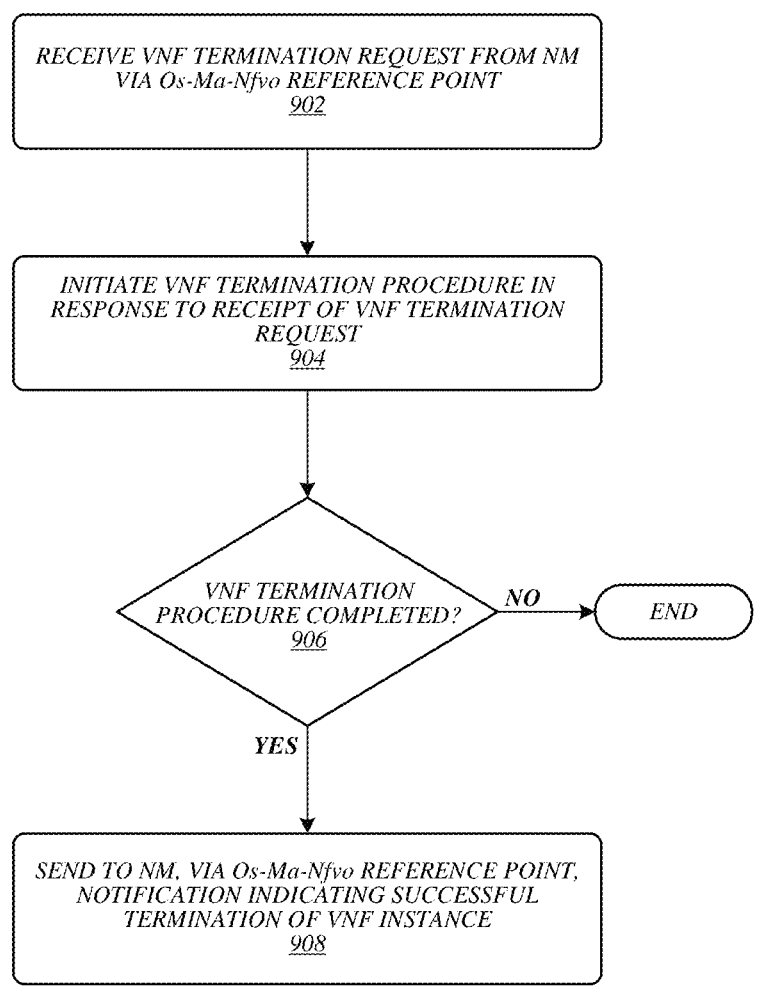
FIG. 9 illustrates an embodiment of a fourth logic flow.

FIG. 9 illustrates an example of a logic flow 900 that may be representative of the implementation of one or more of the disclosed techniques according to various embodiments. For example, logic flow 900 may be representative of operations that may be performed by NFVO 216 in operating environment 400 of FIG. 4. As shown in FIG. 9, a VNF termination request may be received from a network manager via an Os-Ma-Nfvo reference point at 902. For example, in operating environment 400 of FIG. 4, NFVO 216 may receive VNF termination request 440 from network manager 106 via Os-Ma-Nfvo interface 222. In response to receipt of the VNF termination request, a VNF termination procedure may be initiated at 904. For example, in operating environment 400 of FIG. 4, NFVO 216 may initiate a VNF termination procedure in response to receipt of VNF termination request 440. Following 904, flow may pass to 906, from which it may proceed in a manner that depends on whether the VNF termination procedure is successfully completed. If the VNF termination procedure is not successfully completed, the logic flow may end. If the VNF termination procedure is successfully completed, flow may pass to 908. At 908, a notification indicating the successful termination of the VNF instance may be sent to the network manager via the Os-Ma-Nfvo reference point. For example, in operating environment 400 of FIG. 4, NFVO 216 may send VNF termination result notification 446 to network manager 106 via Os-Ma-Nfvo interface 222. The embodiments are not limited to these examples.

Figure 10:
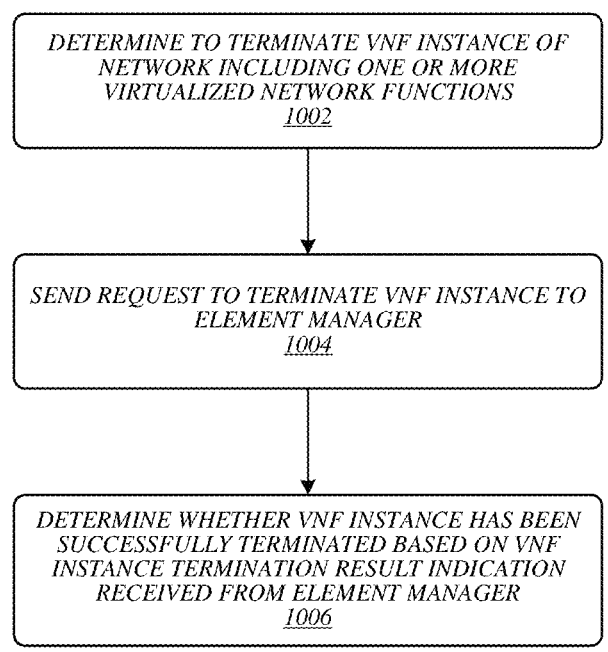
FIG. 10 illustrates an embodiment of a fifth logic flow.

FIG. 10 illustrates an example of a logic flow 1000 that may be representative of the implementation of one or more of the disclosed techniques according to some embodiments. For example, logic flow 1000 may be representative of operations that may be performed by network manager 106 in operating environment 500 of FIG. 5. As shown in FIG. 10, in the context of a network including one or more VNFs, it may be determined at 1002 that a VNF instance is to be terminated. For example, in operating environment 500 of FIG. 5, network manager 106 may determine to terminate VNF 213 of FIG. 2. At 1004, a request to terminate the VNF instance may be sent to an element manager. For example, in operating environment 500 of FIG. 5, network manager 106 may send VNF termination request 548 to element manager 108 via Itf-N interface 128. At 1006, based on a VNF instance termination result indication received from the element manager, it may be determined whether the VNF instance has been successfully terminated. For example, in operating environment 500 of FIG. 5, network manager 106 may determine whether the VNF instance has been successfully terminated based on a VNF termination result notification 558 received from element manager 108 via Itf-N interface 128.

Figure 11:
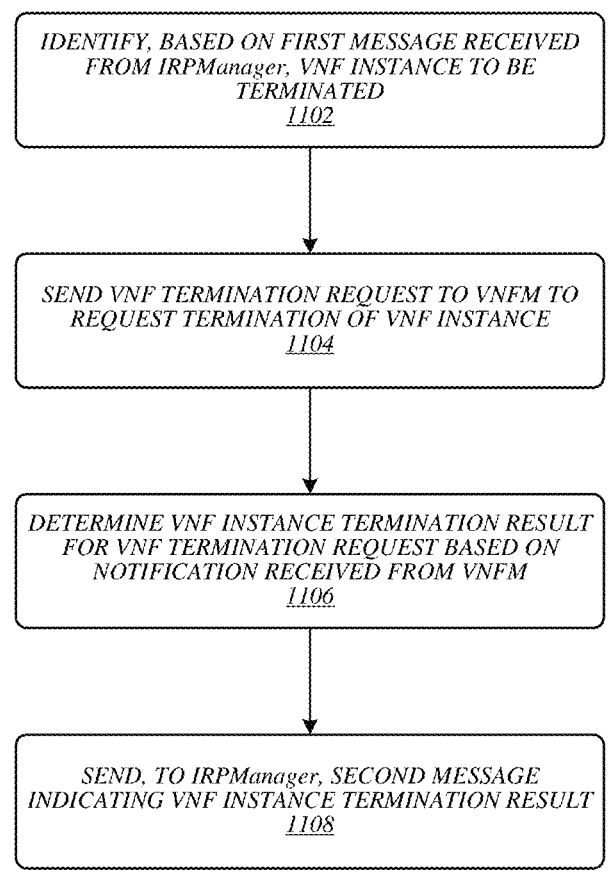
FIG. 11 illustrates an embodiment of a sixth logic flow.

FIG. 11 illustrates an example of a logic flow 1100 that may be representative of the implementation of one or more of the disclosed techniques according to various embodiments. For example, logic flow 1100 may be representative of operations that may be performed by element manager 108 in operating environment 500 of FIG. 5. As shown in FIG. 11, a VNF instance that is to be terminated may be identified at 1102 based on a first message received from an IRPManager. For example, acting as IRPAgent 110 in operating environment 500 of FIG. 5, element manager 108 may identify a VNF instance to be terminated based on a VNF termination request 548 received via Itf-N interface 128 from network manager 106, which may act as IRPManager 112. At 1104, a VNF termination request may be sent to a VNFM to request termination of the VNF instance. For example, in operating environment 500 of FIG. 5, element manager 108 may send VNF termination request 550 to VNFM 218 via Ve-Vnfm-Em interface 224. At 1106, a VNF instance termination result may be determined for the VNF termination request based on a notification received from the VNFM. For example, in operating environment 500 of FIG. 5, element manager 108 may determine a VNF instance termination result for VNF termination request 550 based on a VNF termination result notification 556 received from VNFM 218 via Ve-Vnfm-Em interface 224. At 1108, a second message indicating the VNF instance termination result may be sent to the IRPManager. For example, acting as IRPAgent 110 in operating environment 500 of FIG. 5, element manager 108 may send VNF termination result notification 558 via Itf-N interface 128 to network manager 106, which may act as IRPManager 112. The embodiments are not limited to these examples.

Figure 12:
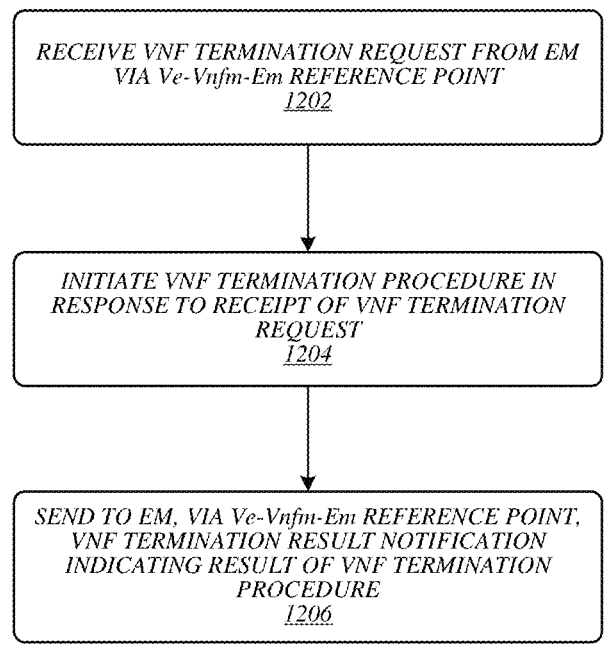
FIG. 12 illustrates an embodiment of a seventh logic flow.

FIG. 12 illustrates an example of a logic flow 1200 that may be representative of the implementation of one or more of the disclosed techniques according to some embodiments. For example, logic flow 1200 may be representative of operations that may be performed by VNFM 218 in operating environment 500 of FIG. 5. As shown in FIG. 12, a VNF termination request may be received from an element manager via a Ve-Vnfm-Em reference point at 1202. For example, in operating environment 500 of FIG. 5, VNFM 218 may receive VNF termination request 550 from element manager 108 via Ve-Vnfm-Em interface 224. In response to receipt of the VNF termination request, a VNF termination procedure may be initiated at 1204. For example, in operating environment 500 of FIG. 5, VNFM 218 may initiate a VNF termination procedure in response to receipt of VNF termination request 550. At 1206, a VNF termination result notification may be sent to the element manager via the Ve-Vnfm-Em reference point, and may indicate a result of the VNF termination procedure. For example, in operating environment 500 of FIG. 5, VNFM 218 may send VNF termination result notification 556 to element manager 108 via Ve-Vnfm-Em interface 224, and VNF termination result notification 556 may indicate whether the VNF termination procedure has succeeded or failed. The embodiments are not limited to these examples.

Figure 13A:
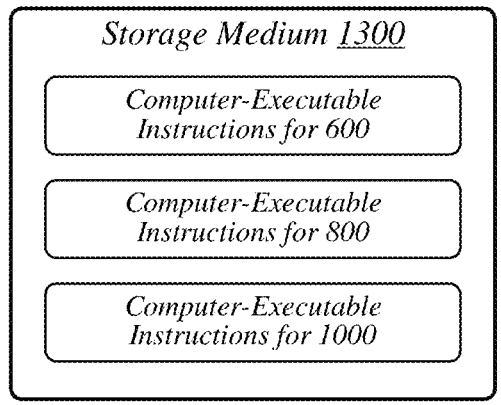
FIG. 13A illustrates an embodiment of a first storage medium.

FIG. 13A illustrates an embodiment of a storage medium 1300. Storage medium 1300 may comprise any computer-readable storage medium or machine-readable storage medium, such as an optical, magnetic or semiconductor storage medium. In some embodiments, storage medium 1300 may comprise a non-transitory storage medium. In various embodiments, storage medium 1300 may comprise an article of manufacture. In some embodiments, storage medium 1300 may store computer-executable instructions, such as computer-executable instructions to implement one or more of logic flow 600, logic flow 800, and logic flow 1000. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited to these examples.

Figure 13B:
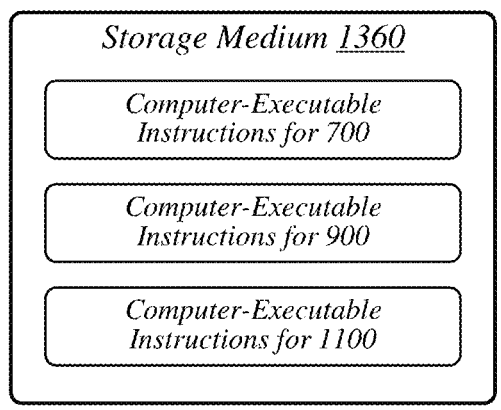
FIG. 13B illustrates an embodiment of a second storage medium.

FIG. 13B illustrates an embodiment of a storage medium 1360. Storage medium 1360 may comprise any computer-readable storage medium or machine-readable storage medium, such as an optical, magnetic or semiconductor storage medium. In some embodiments, storage medium 1360 may comprise a non-transitory storage medium. In various embodiments, storage medium 1360 may comprise an article of manufacture. In some embodiments, storage medium 1360 may store computer-executable instructions, such as computer-executable instructions to implement one or more of logic flow 700, logic flow 900, and logic flow 1100. Examples of a computer-readable storage medium or machine-readable storage medium and of computer-executable instructions may include any of the respective examples identified above in reference to storage medium 1300 of FIG. 13A. The embodiments are not limited to these examples.

Figure 13C:
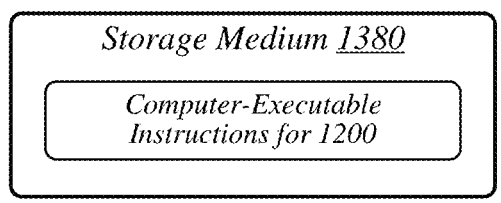
FIG. 13C illustrates an embodiment of a third storage medium.

FIG. 13C illustrates an embodiment of a storage medium 1380. Storage medium 1380 may comprise any computer-readable storage medium or machine-readable storage medium, such as an optical, magnetic or semiconductor storage medium. In some embodiments, storage medium 1380 may comprise a non-transitory storage medium. In various embodiments, storage medium 1380 may comprise an article of manufacture. In some embodiments, storage medium 1380 may store computer-executable instructions, such as computer-executable instructions to implement logic flow 1200. Examples of a computer-readable storage medium or machine-readable storage medium and of computer-executable instructions may include any of the respective examples identified above in reference to storage medium 1300 of FIG. 13A. The embodiments are not limited to these examples.

Figure 14:
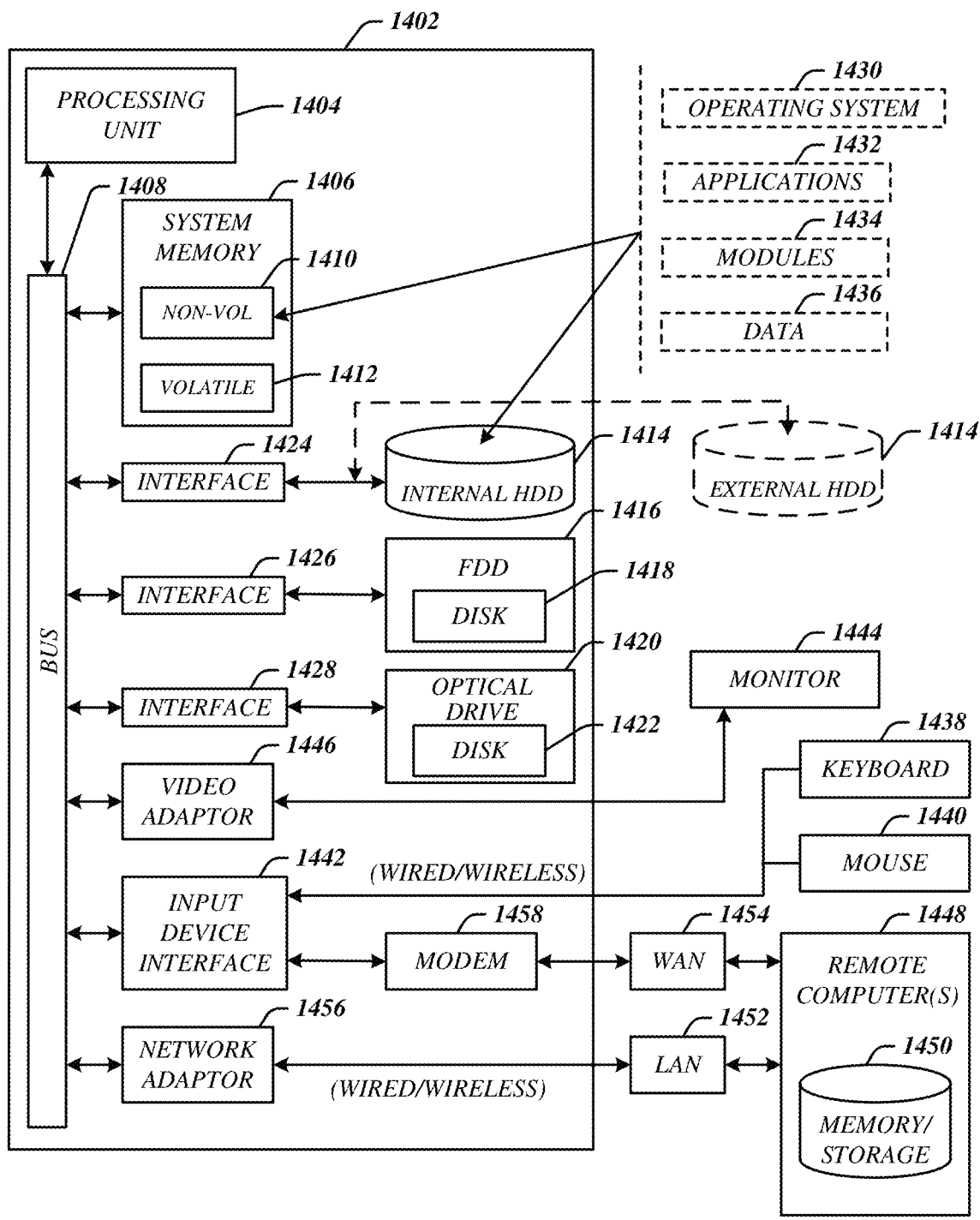
FIG. 14 illustrates an embodiment of a computing architecture.

FIG. 14 illustrates an embodiment of an exemplary computing architecture 1400 that may be suitable for implementing various embodiments as previously described. In various embodiments, the computing architecture 1400 may comprise or be implemented as part of an electronic device. In some embodiments, the computing architecture 1400 may be representative, for example, of a computing device suitable for use in conjunction with implementation of one or more of network manager 106, element manager 108, NFVI 214, NFVO 216, VNFM 218, VIM 220, logic flow 600, logic flow 700, logic flow 800, logic flow 900, logic flow 1000, logic flow 1100, and logic flow 1200. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

As shown in FIG. 14, according to computing architecture 1400, a computer 1402 comprises a processing unit 1404, a system memory 1406 and a system bus 1408. In some embodiments, computer 1402 may comprise a server. In some embodiments, computer 1402 may comprise a client. The processing unit 1404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1404.

The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436.

A user can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. The monitor 1444 may be internal or external to the computer 1402. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 15:
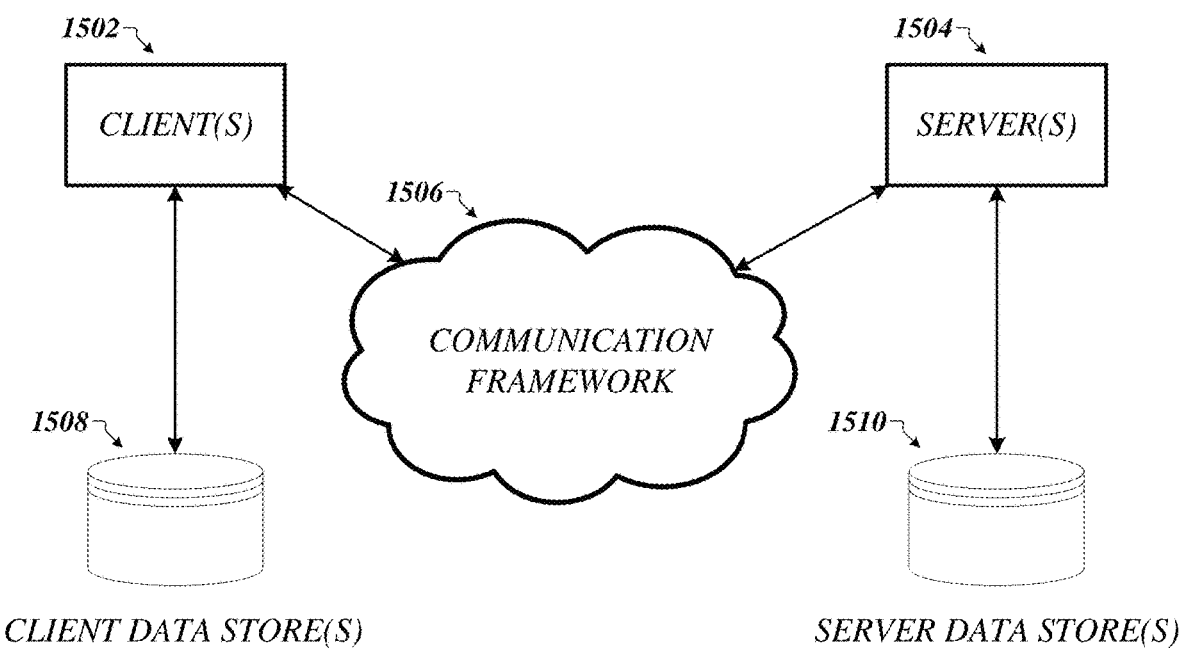
FIG. 15 illustrates an embodiment of a communications architecture.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 comprises includes one or more clients 1502 and servers 1504. The clients 1502 and the servers 1504 are operatively connected to one or more respective client data stores 1508 and server data stores 1510 that can be employed to store information local to the respective clients 1502 and servers 1504, such as cookies and/or associated contextual information. Any one of clients 1502 and/or servers 1504 may implement one or more of network manager 106, element manager 108, NFVI 214, NFVO 216, VNFM 218, VIM 220, logic flow 600, logic flow 700, logic flow 800, logic flow 900, logic flow 1000, logic flow 1100, logic flow 1200, and computing architecture 1400.

The clients 1502 and the servers 1504 may communicate information between each other using a communication framework 1506. The communications framework 1506 may implement any well-known communications techniques and protocols. The communications framework 1506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1502 and the servers 1504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 16:
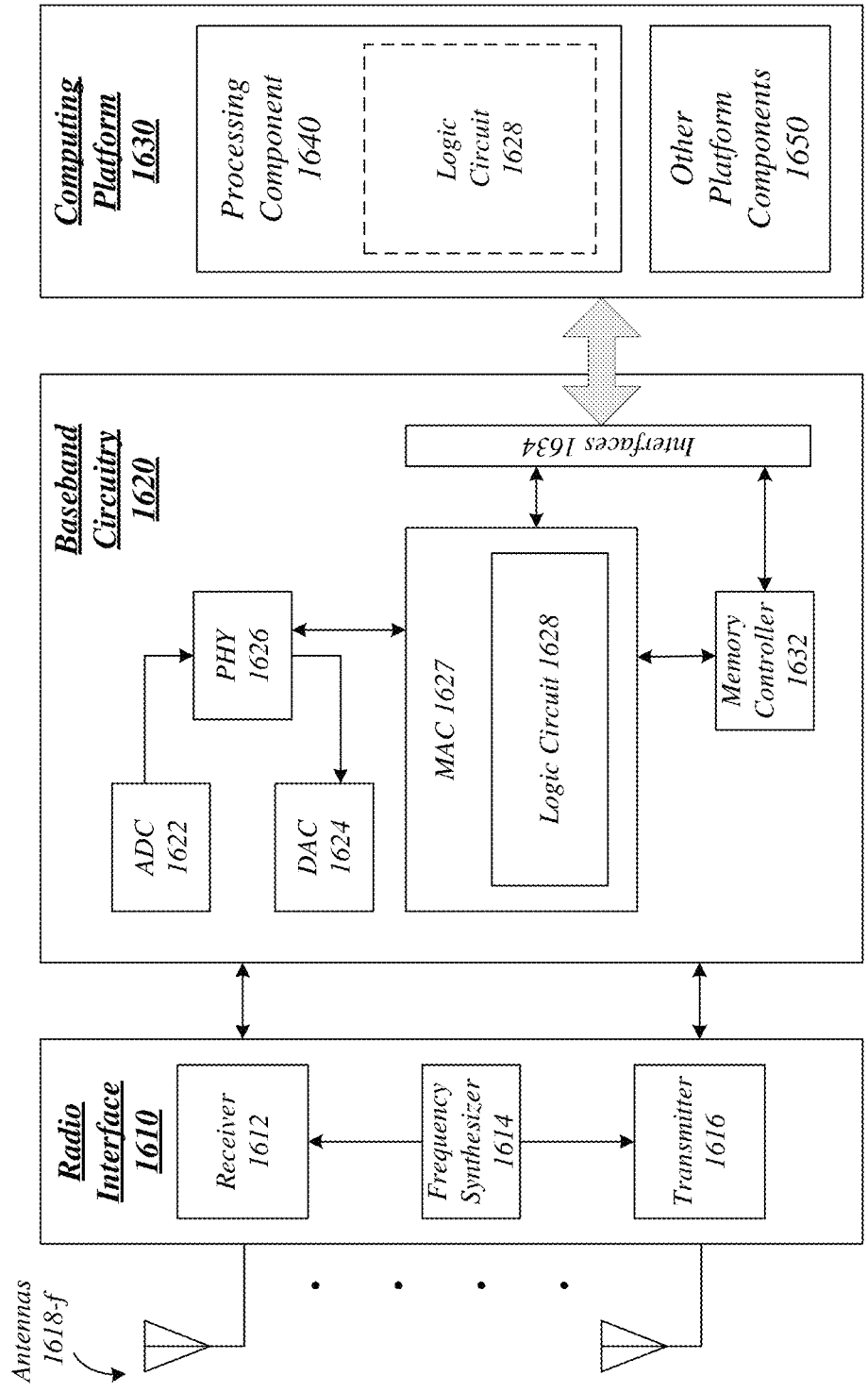
FIG. 16 illustrates an embodiment of a device.

FIG. 16 illustrates an embodiment of a communications device 1600 that may implement one or more of network manager 106, element manager 108, NFVI 214, NFVO 216, VNFM 218, VIM 220, logic flow 600, logic flow 700, logic flow 800, logic flow 900, logic flow 1000, logic flow 1100, logic flow 1200, and computing architecture 1400 according to some embodiments. In various embodiments, device 1600 may comprise a logic circuit 1628. The logic circuit 1628 may include physical circuits to perform operations described for one or more of network manager 106, element manager 108, NFVI 214, NFVO 216, VNFM 218, VIM 220, logic flow m 600, logic flow 700, logic flow 800, logic flow 900, logic flow 1000, logic flow 1100, and logic flow 1200, for example. As shown in FIG. 16, device 1600 may include a radio interface 1610, baseband circuitry 1620, and computing platform 1630, although the embodiments are not limited to this configuration.

The device 1600 may implement some or all of the structure and/or operations for one or more of network manager 106, element manager 108, NFVI 214, NFVO 216, VNFM 218, VIM 220, logic flow 600, logic flow 700, logic flow 800, logic flow 900, logic flow 1000, logic flow 1100, logic flow 1200, storage medium 1300, storage medium 1360, storage medium 1380, computing architecture 1400, and logic circuit 1628 in a single computing entity, such as entirely within a single device. Alternatively, the device 1600 may distribute portions of the structure and/or operations for one or more of network manager 106, element manager 108, NFVI 214, NFVO 216, VNFM 218, VIM 220, logic flow 600, logic flow 700, logic flow 800, logic flow 900, logic flow 1000, logic flow 1100, logic flow 1200, storage medium 1300, storage medium 1360, storage medium 1380, computing architecture 1400, and logic circuit 1628 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1610 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1610 may include, for example, a receiver 1612, a frequency synthesizer 1614, and/or a transmitter 1616. Radio interface 1610 may include bias controls, a crystal oscillator and/or one or more antennas 1618-$f$. In another embodiment, radio interface 1610 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1620 may communicate with radio interface 1610 to process receive and/or transmit signals and may include, for example, a mixer for down-converting received RF signals, an analog-to-digital converter 1622 for converting analog signals to digital form, a digital-to-analog converter 1624 for converting digital signals to analog form, and a mixer for up-converting signals for transmission. Further, baseband circuitry 1620 may include a baseband or physical layer (PHY) processing circuit 1626 for PHY link layer processing of m respective receive/transmit signals. Baseband circuitry 1620 may include, for example, a medium access control (MAC) processing circuit 1627 for MAC/data link layer processing. Baseband circuitry 1620 may include a memory controller 1632 for communicating with MAC processing circuit 1627 and/or a computing platform 1630, for example, via one or more interfaces 1634.

In some embodiments, PHY processing circuit 1626 may include a frame construction and/or detection module, in combination with additional circuitry such as a buffer memory, to construct and/or deconstruct communication frames. Alternatively or in addition, MAC processing circuit 1627 may share processing for certain of these functions or perform these processes independent of PHY processing circuit 1626. In some embodiments, MAC and PHY processing may be integrated into a single circuit.

The computing platform 1630 may provide computing functionality for the device 1600. As shown, the computing platform 1630 may include a processing component 1640. In addition to, or alternatively of, the baseband circuitry 1620, the device 1600 may execute processing operations or logic for one or more of network manager 106, element manager 108, NFVI 214, NFVO 216, VNFM 218, VIM 220, logic flow 600, logic flow 700, logic flow 800, logic flow 900, logic flow 1000, logic flow 1100, logic flow 1200, storage medium 1300, storage medium 1360, storage medium 1380, computing architecture 1400, and logic circuit 1628 using the processing component 1640. The processing component 1640 (and/or PHY 1626 and/or MAC 1627) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1630 may further include other platform components 1650. Other platform components 1650 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1600 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1600 described herein, may be included or omitted in various embodiments of device 1600, as suitably desired.

Embodiments of device 1600 may be implemented using single input single output (SISO) architectures. However, certain implementations may include multiple antennas (e.g., antennas 1618-$f$) for transmission and/or reception using adaptive antenna techniques for beamforming or spatial division multiple access (SDMA) and/or using MIMO communication techniques.

The components and features of device 1600 may be implemented using any combination m of discrete circuitry, application specific integrated circuits (ASICs), logic gates and/or single chip architectures. Further, the features of device 1600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1600 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 17:
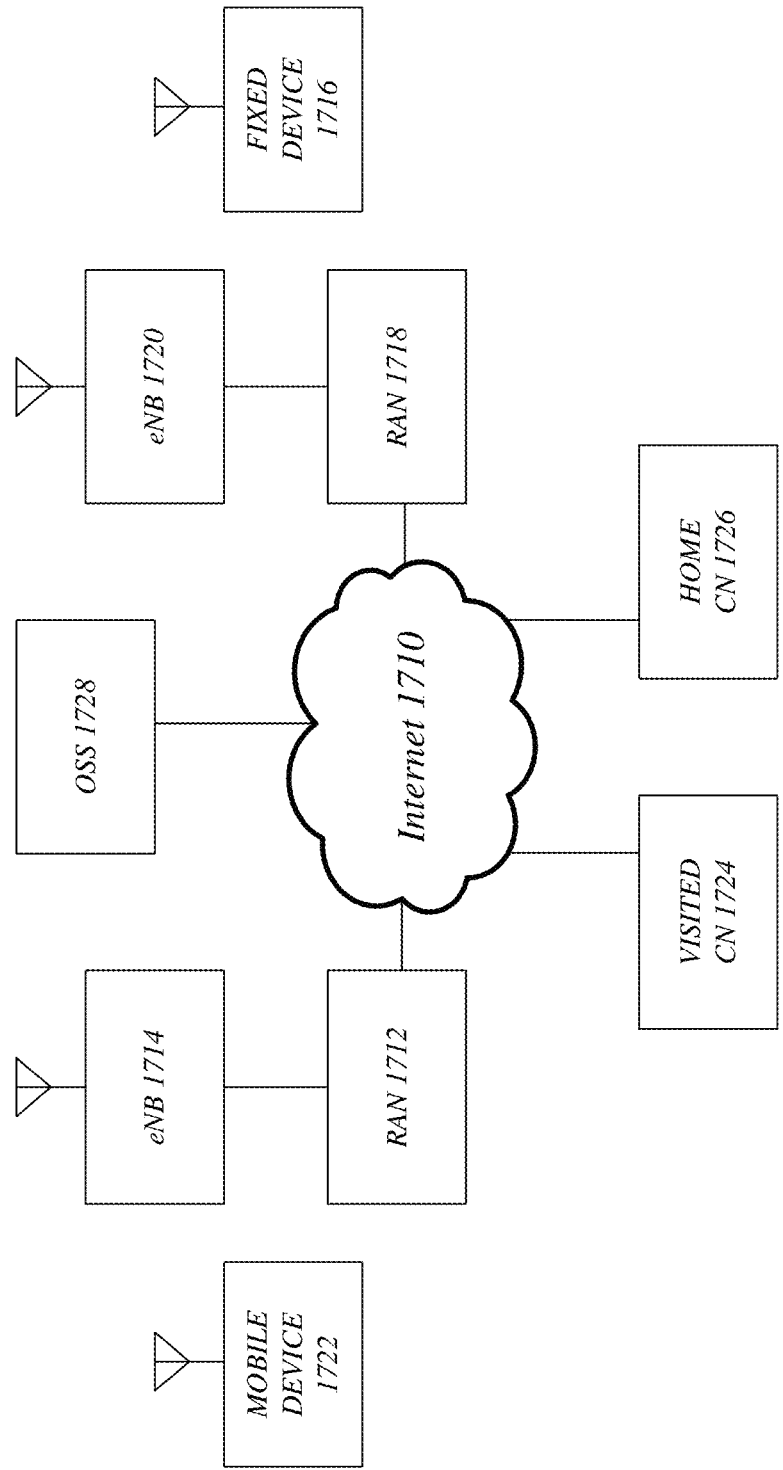
FIG. 17 illustrates an embodiment of a wireless network.

FIG. 17 illustrates an embodiment of a broadband wireless access system 1700. As shown in FIG. 17, broadband wireless access system 1700 may be an internet protocol (IP) type network comprising an internet 1710 type network or the like that is capable of supporting mobile wireless access and/or fixed wireless access to internet 1710. In one or more embodiments, broadband wireless access system 1700 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1700, radio access networks (RANs) 1712 and 1718 are capable of coupling with evolved node Bs (eNBs) 1714 and 1720, respectively, to provide wireless communication between one or more fixed devices 1716 and internet 1710 and/or between or one or more mobile devices 1722 and Internet 1710. One example of a fixed device 1716 and a mobile device 1722 is device 1600 of FIG. 16, with the fixed device 1716 comprising a stationary version of device 1600 and the mobile device 1722 comprising a mobile version of device 1600. RANs 1712 and 1718 may implement profiles that are capable of defining the mapping of network functions to one or more physical entities on broadband wireless access system 1700. eNBs 1714 and 1720 may comprise radio equipment to provide RF communication with fixed device 1716 and/or mobile device 1722, such as described with reference to device 1600, and may comprise, for example, the PHY and MAC layer equipment in compliance with a 3GPP LTE Specification or an IEEE 802.16 Standard. eNBs 1714 and 1720 may further comprise an IP backplane to couple to Internet 1710 via RANs 1712 and 1718, respectively, although the scope of the claimed subject matter is not limited in these respects.

Broadband wireless access system 1700 may further comprise a visited core network (CN) 1724 and/or a home CN 1726, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1724 and/or home CN 1726, and the scope of the claimed subject matter is not limited in these respects. Visited CN 1724 may be referred to as a visited CN in the case where visited CN 1724 is not part of the regular service provider of fixed device 1716 or mobile device 1722, for example where fixed device 1716 or mobile device 1722 is roaming away from its respective home CN 1726, or where broadband wireless access system 1700 is part of the regular service provider of fixed device 1716 or mobile device 1722 but where broadband wireless access system 1700 may be in another location or state that is not the main or home location of fixed device 1716 or mobile device 1722. The embodiments are not limited in this context.

Fixed device 1716 may be located anywhere within range of one or both of eNBs 1714 and 1720, such as in or near a home or business to provide home or business customer broadband access to Internet 1710 via eNBs 1714 and 1720 and RANs 1712 and 1718, respectively, and home CN 1726. It is worthy of note that although fixed device 1716 is generally disposed in a stationary location, it may be moved to different locations as needed. Mobile device 1722 may be utilized at one or more locations if mobile device 1722 is within range of one or both of eNBs 1714 and 1720, for example. In accordance with one or more embodiments, operation support system (OSS) 1728 may be part of broadband wireless access system 1700 to provide management functions for broadband wireless access system 1700 and to provide interfaces between functional entities of broadband wireless access system 1700. Broadband wireless access system 1700 of FIG. 17 is merely one type of wireless network showing a certain number of the components of broadband wireless access system 1700, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is at least one computer-readable storage medium comprising a set of instructions that, in response to being executed on a computing device, cause the computing device to identify, based on a first message received from an integration reference point manager (IRPManager), a virtualized network function (VNF) instance to be terminated, send a VNF termination request to a virtualized network functions manager (VNFM) to request termination of the VNF instance, determine a VNF instance termination result for the VNF termination request based on a notification received from the VNFM, and send a second message to the IRPManager, the second message to indicate the VNF instance termination result.

Example 2 is the at least one computer-readable storage medium of Example 1, comprising instructions that, in response to being executed on the computing device, cause the computing device to receive the first message from the IRPManager via an Itf-N reference point, and send the second message to the IRPManager via the Itf-N reference point.

Example 3 is the at least one computer-readable storage medium of any of Examples 1 to 2, comprising instructions that, in response to being executed on the computing device, cause the computing device to send the VNF termination request to the VNFM via a Ve-Vnfm-Em reference point, and receive the notification from the VNFM via the Ve-Vnfm-Em reference point.

Example 4 is the at least one computer-readable storage medium of any of Examples 1 to 3, comprising instructions that, in response to being executed on the computing device, cause the computing device to send the second message to the IRPManager while acting as an integration reference point agent (IRPAgent).

Example 5 is the at least one computer-readable storage medium of any of Examples 1 to 4, the IRPManager to comprise a network manager (NM) entity.

Example 6 is the at least one computer-readable storage medium of any of Examples 1 to 5, the VNF instance termination result to comprise either a success result or a failure result.

Example 7 is the at least one computer-readable storage medium of any of Examples 1 to 6, the VNF instance to comprise a VNF instance that is not providing network services.

Example 8 is at least one computer-readable storage medium comprising a set of instructions that, in response to being executed on a computing device, cause the computing device to determine to terminate a virtualized network function (VNF) instance of a network including one or more virtualized network functions, send a request to terminate the VNF instance to an element manager (EM), and determine whether the VNF instance has been successfully terminated based on a VNF instance termination result indication received from the EM.

Example 9 is the at least one computer-readable storage medium of Example 8, comprising instructions that, in response to being executed on the computing device, cause the computing device to send the request to the EM via an Itf-N interface, and receive the VNF instance termination result indication from the EM via the Itf-N interface.

Example 10 is the at least one computer-readable storage medium of any of Examples 8 to 9, comprising instructions that, in response to being executed on the computing device, cause the computing device to send the request to terminate the VNF instance while acting as an integration reference point manager (IRPManager).

Example 11 is the at least one computer-readable storage medium of any of Examples 8 to 10, the EM to comprise an integration reference point agent (IRPAgent).

Example 12 is the at least one computer-readable storage medium of any of Examples 8 to 11, the VNF instance termination result indication to indicate either a success result or a failure result.

Example 13 is the at least one computer-readable storage medium of any of Examples 8 to 12, comprising instructions that, in response to being executed on the computing device, cause the computing device to determine to terminate the VNF instance based on a determination that the VNF instance is not providing network services.

Example 14 is the at least one computer-readable storage medium of any of Examples 8 to 13, the request to contain a VNF instance identifier associated with the VNF instance.

Example 15 is an apparatus, comprising processing circuitry, and computer-readable storage media having stored thereon instructions for execution by the processing circuitry to identify, based on a first message received via an Itf-N interface, a virtualized network function (VNF) instance to be terminated, send a VNF termination request via a Ve-Vnfm-Em interface to request termination of the VNF instance, determine a VNF instance termination result for the VNF termination request based on a notification received via the Ve-Vnfm-Em interface, and send a second message via the Itf-N interface, the second message to indicate the VNF instance termination result.

Example 16 is the apparatus of Example 15, the instructions for execution by the processing circuitry to receive the first message from an integration reference point manager (IRPManager) via the Itf-N interface, and send the second message to the IRPManager via the Itf-N interface.

Example 17 is the apparatus of Example 16, the IRPManager to comprise a network manager (NM) entity.

Example 18 is the apparatus of any of Examples 15 to 17, the instructions for execution by the processing circuitry to send the VNF termination request to a virtualized network functions manager (VNFM) via the Ve-Vnfm-Em interface, and receive the notification from the VNFM via the Ve-Vnfm-Em interface.

Example 19 is the apparatus of any of Examples 15 to 18, the instructions for execution by the processing circuitry to send the second message via the Itf-N interface while acting as an integration reference point agent (IRPAgent).

Example 20 is the apparatus of any of Examples 15 to 19, the VNF instance termination result to comprise either a success result or a failure result.

Example 21 is the apparatus of any of Examples 15 to 20, the VNF instance to comprise a VNF instance that is not providing network services.

Example 22 is a system, comprising an apparatus according to any of Examples 15 to 21, and at least one network interface adapter.

Example 23 is an apparatus, comprising processing circuitry, and computer-readable storage media having stored thereon instructions for execution by the processing circuitry to determine to terminate a virtualized network function (VNF) instance of a network including one or more virtualized network functions, send, via an Itf-N reference point, a request to terminate the VNF instance, and determine whether the VNF instance has been successfully terminated based on a VNF instance termination result indication received via the Itf-N reference point.

Example 24 is the apparatus of Example 23, the instructions for execution by the processing circuitry to send the request to an element manager (EM) via the Itf-N interface, and receive the VNF instance termination result indication from the EM via the Itf-N interface.

Example 25 is the apparatus of Example 24, the EM to comprise an integration reference point agent (IRPAgent).

Example 26 is the apparatus of any of Examples 23 to 25, the instructions for execution by the processing circuitry to send the request to terminate the VNF instance while acting as an integration reference point manager (IRPManager).

Example 27 is the apparatus of any of Examples 23 to 26, the VNF instance termination result indication to indicate either a success result or a failure result.

Example 28 is the apparatus of any of Examples 23 to 27, the instructions for execution by the processing circuitry to determine to terminate the VNF instance based on a determination that the VNF instance is not providing network services.

Example 29 is the apparatus of any of Examples 23 to 28, the request to contain a VNF instance identifier associated with the VNF instance.

Example 30 is a system, comprising an apparatus according to any of Examples 23 to 29, and at least one network interface adapter.

Example 31 is a network manager (NM), comprising processing circuitry, and computer-readable storage media having stored thereon instructions for execution by the processing circuitry to determine to instantiate a virtualized network function (VNF) instance, send a VNF instantiation request to a network functions virtualization orchestrator (NFVO) to request instantiation of the VNF instance, and determine that instantiation of the VNF instance has been successful based on receipt of a VNF instantiation result notification from the NFVO.

Example 32 is the NM of Example 31, the VNF instantiation request to be sent to the NFVO via an Os-Ma-Nfvo reference point.

Example 33 is the NM of any of Examples 31 to 32, the computer-readable storage media having stored thereon instructions for execution by the processing circuitry to select a VNF descriptor (VNFD) for the VNF instance to be instantiated, determine a VNFD identifier (ID) associated with the selected VNFD, and include the VNFD ID in the VNF instantiation request.

Example 34 is the NM of any of Examples 31 to 33, the computer-readable storage media having stored thereon instructions for execution by the processing circuitry to select a deployment flavor for the VNF instance to be instantiated, determine a flavor (ID) associated with the selected deployment flavor, and include the flavor ID in the VNF instantiation request.

Example 35 is the NM of any of Examples 31 to 34, the VNF instantiation result notification to contain a result parameter, the result parameter to comprise a value indicating successful instantiation of the VNF instance.

Example 36 is the NM of any of Examples 31 to 35, the VNF instantiation result notification to contain a VNF instance identifier (ID) associated with the VNF instance.

Example 37 is a system, comprising the NM of any of Examples 31 to 36, and at least one network interface adapter.

Example 38 is a computer-readable medium storing executable instructions that, in response to execution, cause one or more processors of a network function virtualization orchestration (NFVO), to perform operations comprising processing an VNF instantiation request received from network manager (NM), and determining to send a notification indicating that the VNF instantiation has started to network manager (NM), and determining to send a notification to NM indicating the result (e.g. success or failure) of VNF instantiation, when the VNF instantiation procedure is completed.

Example 39 is at least one computer-readable storage medium comprising a set of instructions that, in response to being executed by processing circuitry of a network manager (NM), cause the NM to determine to terminate a virtualized network function (VNF) instance, send a VNF termination request to a network functions virtualization orchestrator (NFVO) to request termination of the VNF instance, and determine that termination of the VNF instance has been successful based on receipt of a VNF termination result notification from the NFVO.

Example 40 is the at least one computer-readable storage medium of Example 39, the VNF termination request to be sent to the NFVO via an Os-Ma-Nfvo reference point.

Example 41 is the at least one computer-readable storage medium of any of Examples 39 to 40, comprising instructions that, in response to being executed by the processing circuitry of the NM, cause the NM to determine a VNF instance identifier (ID) associated with the VNF instance, and include the VNF instance ID in the VNF termination request.

Example 42 is the at least one computer-readable storage medium of any of Examples 39 to 41, comprising instructions that, in response to being executed by the processing circuitry of the NM, cause the NM to set a termination type parameter of the VNF termination request to a value indicating a request for forceful termination of the VNF instance.

Example 43 is the at least one computer-readable storage medium of any of Examples 39 to 42, the VNF termination result notification to contain a result parameter, the result parameter to comprise a value indicating successful termination of the VNF instance.

Example 44 is the at least one computer-readable storage medium of any of Examples 39 to 43, comprising instructions that, in response to being executed by the processing circuitry of the NM, cause the NM to determine that the termination of the VNF instance has commenced based on receipt of a VNF termination start notification from the NFVO.

Example 45 is a computer-readable medium storing executable instructions that, in response to execution, cause one or more processors of a network function virtualization orchestration (NFVO), to perform operations comprising processing an VNF termination request received from network manager (NM), and determining to send a notification indicating that the VNF termination has started to network manager (NM), and determining to send a notification to NM indicating the result (e.g. success or failure) of VNF termination, when the VNF termination procedure is completed.

Example 46 is a computer-readable medium storing executable instructions that, in response to execution, cause one or more processors of a virtualized network function manager (VNFM), to perform operations comprising processing an VNF termination request received from element manager (EM), determining to send a notification indicating that the VNF termination has started to element manager (EM), and determining to send a notification to EM indicating the result (e.g. success or failure) of VNF termination, when the VNF termination procedure is completed.

Example 47 is at least one computer-readable storage medium comprising a set of instructions that, in response to being executed by processing circuitry of an element manager (EM), cause the EM to determine to terminate a virtualized network function (VNF) instance, send a VNF termination request to a VNF manager (VNFM) to request termination of the VNF instance, determine that termination of the VNF instance has been successful based on receipt of a VNF termination result notification from the VNFM, and determine to send a VNF termination result notification to Network Manager (NM).

Example 48 is the at least one computer-readable storage medium of Example 47, comprising instructions that, in response to being executed by the processing circuitry of the EM, cause the EM to determine to terminate the VNF instance based on receipt of a VNF termination request from a network manager (NM).

Example 49 is the at least one computer-readable storage medium of any of Examples 47 to 48, the VNF termination request to be sent to the VNFM via an Ve-Vnfm-Em reference point.

Example 50 is the at least one computer-readable storage medium of any of Examples 47 to 49, comprising instructions that, in response to being executed by the processing circuitry of the EM, cause the EM to determine a VNF instance identifier (ID) associated with the VNF instance, and include the VNF instance ID in the VNF termination request.

Example 51 is the at least one computer-readable storage medium of any of Examples 47 to 50, comprising instructions that, in response to being executed by the processing circuitry of the EM, cause the EM to set a termination type parameter of the VNF termination request to a value indicating a request for forceful termination of the VNF instance.

Example 52 is the at least one computer-readable storage medium of any of Examples 47 to 51, the VNF termination result notification to contain a result parameter, the result parameter to comprise a value indicating successful termination of the VNF instance.

Example 53 is the at least one computer-readable storage medium of any of Examples 47 to 52, comprising instructions that, in response to being executed by the processing circuitry of the EM, cause the EM to determine that the termination of the VNF instance has commenced based on receipt of a VNF termination start notification from the VNFM.

Example 54 is a method, comprising identifying, based on a first message received from an integration reference point manager (IRPManager), a virtualized network function (VNF) instance to be terminated, sending a VNF termination request to a virtualized network functions manager (VNFM) to request termination of the VNF instance, determining a VNF instance termination result for the VNF termination request based on a notification received from the VNFM, and sending a second message to the IRPManager, the second message to indicate the VNF instance termination result.

Example 55 is the method of Example 54, comprising receiving the first message from the IRPManager via an Itf-N reference point, and sending the second message to the IRPManager via the Itf-N reference point.

Example 56 is the method of any of Examples 54 to 55, comprising sending the VNF termination request to the VNFM via a Ve-Vnfm-Em reference point, and receiving the notification from the VNFM via the Ve-Vnfm-Em reference point.

Example 57 is the method of any of Examples 54 to 56, comprising sending the second message to the IRPManager while acting as an integration reference point agent (IRPAgent).

Example 58 is the method of any of Examples 54 to 57, the IRPManager to comprise a network manager (NM) entity.

Example 59 is the method of any of Examples 54 to 58, the VNF instance termination result to comprise either a success result or a failure result.

Example 60 is the method of any of Examples 54 to 59, the VNF instance to comprise a VNF instance that is not providing network services.

Example 61 is at least one computer-readable storage medium comprising a set of instructions that, in response to being executed on a computing device, cause the computing device to perform a method according to any of Examples 54 to 60.

Example 62 is an apparatus, comprising means for performing a method according to any of Examples 54 to 60.

Example 63 is a system, comprising the apparatus of Example 62, and at least one network interface adapter.

Example 64 is a method, comprising determining to terminate a virtualized network function (VNF) instance of a network including one or more virtualized network functions, sending a request to terminate the VNF instance to an element manager (EM), and determining whether the VNF instance has been successfully terminated based on a VNF instance termination result indication received from the EM.

Example 65 is the method of Example 64, comprising sending the request to the EM via an Itf-N interface, and receiving the VNF instance termination result indication from the EM via the Itf-N interface.

Example 66 is the method of any of Examples 64 to 65, comprising sending the request to terminate the VNF instance while acting as an integration reference point manager (IRPManager).

Example 67 is the method of any of Examples 64 to 66, the EM to comprise an integration reference point agent (IRPAgent).

Example 68 is the method of any of Examples 64 to 67, the VNF instance termination result indication to indicate either a success result or a failure result.

Example 69 is the method of any of Examples 64 to 68, comprising determining to terminate the VNF instance based on a determination that the VNF instance is not providing network services.

Example 70 is the method of any of Examples 64 to 69, the request to contain a VNF instance identifier associated with the VNF instance.

Example 71 is at least one computer-readable storage medium comprising a set of instructions that, in response to being executed on a computing device, cause the computing device to perform a method according to any of Examples 64 to 70.

Example 72 is an apparatus, comprising means for performing a method according to any of Examples 64 to 70.

Example 73 is a system, comprising the apparatus of Example 72, and at least one network interface adapter.

Example 74 is at least one computer-readable storage medium comprising a set of instructions that, in response to being executed on a computing device, cause the computing device to identify, based on a first message received via an Itf-N interface, a virtualized network function (VNF) instance to be terminated, send a VNF termination request via a Ve-Vnfm-Em interface to request termination of the VNF instance, determine a VNF instance termination result for the VNF termination request based on a notification received via the Ve-Vnfm-Em interface, and send a second message via the Itf-N interface, the second message to indicate the VNF instance termination result.

Example 75 is the at least one computer-readable storage medium of Example 74, comprising instructions that, in response to being executed on the computing device, cause the computing device to receive the first message from an integration reference point manager (IRPManager) via the Itf-N interface, and send the second message to the IRPManager via the Itf-N interface.

Example 76 is the at least one computer-readable storage medium of Example 75, the IRPManager to comprise a network manager (NM) entity.

Example 77 is the at least one computer-readable storage medium of any of Examples 74 to 76, comprising instructions that, in response to being executed on the computing device, cause the computing device to send the VNF termination request to a virtualized network functions manager (VNFM) via the Ve-Vnfm-Em interface, and receive the notification from the VNFM via the Ve-Vnfm-Em interface.

Example 78 is the at least one computer-readable storage medium of any of Examples 74 to 77, comprising instructions that, in response to being executed on the computing device, cause the computing device to send the second message via the Itf-N interface while acting as an integration reference point agent (IRPAgent).

Example 79 is the at least one computer-readable storage medium of any of Examples 74 to 78, the VNF instance termination result to comprise either a success result or a failure result.

Example 80 is the at least one computer-readable storage medium of any of Examples 74 to 79, the VNF instance to comprise a VNF instance that is not providing network services.

Example 81 is at least one computer-readable storage medium comprising a set of instructions that, in response to being executed on a computing device, cause the computing device to determine to terminate a virtualized network function (VNF) instance of a network including one or more virtualized network functions, send, via an Itf-N reference point, a request to terminate the VNF instance, and determine whether the VNF instance has been successfully terminated based on a VNF instance termination result indication received via the Itf-N reference point.

Example 82 is the at least one computer-readable storage medium of Example 81, comprising instructions that, in response to being executed on the computing device, cause the computing device to send the request to an element manager (EM) via the Itf-N interface, and receive the VNF instance termination result indication from the EM via the Itf-N interface.

Example 83 is the at least one computer-readable storage medium of Example 82, the EM to comprise an integration reference point agent (IRPAgent).

Example 84 is the at least one computer-readable storage medium of any of Examples 81 to 83, comprising instructions that, in response to being executed on the computing device, cause the computing device to send the request to terminate the VNF instance while acting as an integration reference point manager (IRPManager).

Example 85 is the at least one computer-readable storage medium of any of Examples 81 to 84, the VNF instance termination result indication to indicate either a success result or a failure result.

Example 86 is the at least one computer-readable storage medium of any of Examples 81 to 85, comprising instructions that, in response to being executed on the computing device, cause the computing device to determine to terminate the VNF instance based on a determination that the VNF instance is not providing network services.

Example 87 is the at least one computer-readable storage medium of any of Examples 81 to 86, the request to contain a VNF instance identifier associated with the VNF instance.

Example 88 is at least one computer-readable storage medium comprising a set of instructions that, in response to being executed on a computing device, cause the computing device to determine to instantiate a virtualized network function (VNF) instance, send a VNF instantiation request to a network functions virtualization orchestrator (NFVO) to request instantiation of the VNF instance, and determine that instantiation of the VNF instance has been successful based on receipt of a VNF instantiation result notification from the NFVO.

Example 89 is the at least one computer-readable storage medium of Example 88, the VNF instantiation request to be sent to the NFVO via an Os-Ma-Nfvo reference point.

Example 90 is the at least one computer-readable storage medium of any of Examples 88 to 89, comprising instructions that, in response to being executed on the computing device, cause the computing device to select a VNF descriptor (VNFD) for the VNF instance to be instantiated, determine a VNFD identifier (ID) associated with the selected VNFD, and include the VNFD ID in the VNF instantiation request.

Example 91 is the at least one computer-readable storage medium of any of Examples 88 to 90, comprising instructions that, in response to being executed on the computing device, cause the computing device to select a deployment flavor for the VNF instance to be instantiated, determine a flavor (ID) associated with the selected deployment flavor, and include the flavor ID in the VNF instantiation request.

Example 92 is the at least one computer-readable storage medium of any of Examples 88 to 91, the VNF instantiation result notification to contain a result parameter, the result parameter to comprise a value indicating successful instantiation of the VNF instance.

Example 93 is the at least one computer-readable storage medium of any of Examples 88 to 92, the VNF instantiation result notification to contain a VNF instance identifier (ID) associated with the VNF instance.

Example 94 is a method, comprising processing an VNF instantiation request received from network manager (NM), determining to send a notification indicating that the VNF instantiation has started to network manager (NM), and determining to send a notification to NM indicating the result (e.g. success or failure) of VNF instantiation, when the VNF instantiation procedure is completed.

Example 95 is a method, comprising determining to terminate a virtualized network function (VNF) instance, sending a VNF termination request to a network functions virtualization orchestrator (NFVO) to request termination of the VNF instance, and determining that termination of the VNF instance has been successful based on receipt of a VNF termination result notification from the NFVO.

Example 96 is the method of Example 95, the VNF termination request to be sent to the NFVO via an Os-Ma-Nfvo reference point.

Example 97 is the method of any of Examples 95 to 96, comprising determining a VNF instance identifier (ID) associated with the VNF instance, and including the VNF instance ID in the VNF termination request.

Example 98 is the method of any of Examples 95 to 97, comprising setting a termination type parameter of the VNF termination request to a value indicating a request for forceful termination of the VNF instance.

Example 99 is the method of any of Examples 95 to 98, the VNF termination result notification to contain a result parameter, the result parameter to comprise a value indicating successful termination of the VNF instance.

Example 100 is the method of any of Examples 95 to 99, comprising determining that the termination of the VNF instance has commenced based on receipt of a VNF termination start notification from the NFVO.

Example 101 is at least one computer-readable storage medium comprising a set of instructions that, in response to being executed on a computing device, cause the computing device to perform a method according to any of Examples 95 to 100.

Example 102 is an apparatus, comprising means for performing a method according to any of Examples 95 to 100.

Example 103 is a system, comprising the apparatus of Example 102, and at least one network interface adapter.

Example 104 is a method, comprising processing an VNF termination request received from network manager (NM), determining to send a notification indicating that the VNF termination has started to network manager (NM), and determining to send a notification to NM indicating the result (e.g. success or failure) of VNF termination, when the VNF termination procedure is completed.

Example 105 is a method, comprising processing an VNF termination request received from element manager (EM), determining to send a notification indicating that the VNF termination has started to element manager (EM), and determining to send a notification to EM indicating the result (e.g. success or failure) of VNF termination, when the VNF termination procedure is completed.

Example 106 is a method, comprising determining to terminate a virtualized network function (VNF) instance, sending a VNF termination request to a VNF manager (VNFM) to request termination of the VNF instance, determining that termination of the VNF instance has been successful based on receipt of a VNF termination result notification from the VNFM, and determining to send a VNF termination result notification to Network Manager (NM).

Example 107 is the method of Example 106, comprising determining to terminate the VNF instance based on receipt of a VNF termination request from a network manager (NM).

Example 108 is the method of any of Examples 106 to 107, the VNF termination request to be sent to the VNFM via an Ve-Vnfm-Em reference point.

Example 109 is the method of any of Examples 106 to 108, comprising determining a VNF instance identifier (ID) associated with the VNF instance, and including the VNF instance ID in the VNF termination request.

Example 110 is the method of any of Examples 106 to 109, comprising setting a termination type parameter of the VNF termination request to a value indicating a request for forceful termination of the VNF instance.

Example 111 is the method of any of Examples 106 to 110, the VNF termination result notification to contain a result parameter, the result parameter to comprise a value indicating successful termination of the VNF instance.

Example 112 is the method of any of Examples 106 to 111, comprising determining that the termination of the VNF instance has commenced based on receipt of a VNF termination start notification from the VNFM.

Example 113 is at least one computer-readable storage medium comprising a set of instructions that, in response to being executed on a computing device, cause the computing device to perform a method according to any of Examples 106 to 112.

Example 114 is an apparatus, comprising means for performing a method according to any of Examples 106 to 112.

Example 115 is a system, comprising the apparatus of Example 114, and at least one network interface adapter.

Example 116 is an apparatus, comprising means for identifying, based on a first message received from an integration reference point manager (IRPManager), a virtualized network function (VNF) instance to be terminated, means for sending a VNF termination request to a virtualized network functions manager (VNFM) to request termination of the VNF instance, means for determining a VNF instance termination result for the VNF termination request based on a notification received from the VNFM, and means for sending a second message to the IRPManager, the second message to indicate the VNF instance termination result.

Example 117 is the apparatus of Example 116, comprising means for receiving the first message from the IRPManager via an Itf-N reference point, and means for sending the second message to the IRPManager via the Itf-N reference point.

Example 118 is the apparatus of any of Examples 116 to 117, comprising means for sending the VNF termination request to the VNFM via a Ve-Vnfm-Em reference point, and means for receiving the notification from the VNFM via the Ve-Vnfm-Em reference point.

Example 119 is the apparatus of any of Examples 116 to 118, comprising means for sending the second message to the IRPManager while acting as an integration reference point agent (IRPAgent).

Example 120 is the apparatus of any of Examples 116 to 119, the IRPManager to comprise a network manager (NM) entity.

Example 121 is the apparatus of any of Examples 116 to 120, the VNF instance termination result to comprise either a success result or a failure result.

Example 122 is the apparatus of any of Examples 116 to 121, the VNF instance to comprise a VNF instance that is not providing network services.

Example 123 is a system, comprising an apparatus according to any of Examples 116 to 122, and at least one network interface adapter.

Example 124 is an apparatus, comprising means for determining to terminate a virtualized network function (VNF) instance of a network including one or more virtualized network functions, means for sending a request to terminate the VNF instance to an element manager (EM), and means for determining whether the VNF instance has been successfully terminated based on a VNF instance termination result indication received from the EM.

Example 125 is the apparatus of Example 124, comprising means for sending the request to the EM via an Itf-N interface, and means for receiving the VNF instance termination result indication from the EM via the Itf-N interface.

Example 126 is the apparatus of any of Examples 124 to 125, comprising means for sending the request to terminate the VNF instance while acting as an integration reference point manager (IRPManager).

Example 127 is the apparatus of any of Examples 124 to 126, the EM to comprise an integration reference point agent (IRPAgent).

Example 128 is the apparatus of any of Examples 124 to 127, the VNF instance termination result indication to indicate either a success result or a failure result.

Example 129 is the apparatus of any of Examples 124 to 128, comprising means for determining to terminate the VNF instance based on a determination that the VNF instance is not providing network services.

Example 130 is the apparatus of any of Examples 124 to 129, the request to contain a VNF instance identifier associated with the VNF instance.

Example 131 is a system, comprising an apparatus according to any of Examples 124 to 130, and at least one network interface adapter.

Example 132 is a method, comprising identifying, based on a first message received via an Itf-N interface, a virtualized network function (VNF) instance to be terminated, sending a VNF termination request via a Ve-Vnfm-Em interface to request termination of the VNF instance, determining a VNF instance termination result for the VNF termination request based on a notification received via the Ve-Vnfm-Em interface, and sending a second message via the Itf-N interface, the second message to indicate the VNF instance termination result.

Example 133 is the method of Example 132, comprising receiving the first message from an integration reference point manager (IRPManager) via the Itf-N interface, and sending the second message to the IRPManager via the Itf-N interface.

Example 134 is the method of Example 133, the IRPManager to comprise a network manager (NM) entity.

Example 135 is the method of any of Examples 132 to 134, comprising sending the VNF termination request to a virtualized network functions manager (VNFM) via the Ve-Vnfm-Em interface, and receiving the notification from the VNFM via the Ve-Vnfm-Em interface.

Example 136 is the method of any of Examples 132 to 135, comprising sending the second message via the Itf-N interface while acting as an integration reference point agent (IRPAgent).

Example 137 is the method of any of Examples 132 to 136, the VNF instance termination result to comprise either a success result or a failure result.

Example 138 is the method of any of Examples 132 to 137, the VNF instance to comprise a VNF instance that is not providing network services.

Example 139 is at least one computer-readable storage medium comprising a set of instructions that, in response to being executed on a computing device, cause the computing device to perform a method according to any of Examples 132 to 138.

Example 140 is an apparatus, comprising means for performing a method according to any of Examples 132 to 138.

Example 141 is a system, comprising the apparatus of Example 140, and at least one network interface adapter.

Example 142 is a method, comprising determining to terminate a virtualized network function (VNF) instance of a network including one or more virtualized network functions, sending, via an Itf-N reference point, a request to terminate the VNF instance, and determining whether the VNF instance has been successfully terminated based on a VNF instance termination result indication received via the Itf-N reference point.

Example 143 is the method of Example 142, comprising sending the request to an element manager (EM) via the Itf-N interface, and receiving the VNF instance termination result indication from the EM via the Itf-N interface.

Example 144 is the method of Example 143, the EM to comprise an integration reference point agent (IRPAgent).

Example 145 is the method of any of Examples 142 to 144, comprising sending the request to terminate the VNF instance while acting as an integration reference point manager (IRPManager).

Example 146 is the method of any of Examples 142 to 145, the VNF instance termination result indication to indicate either a success result or a failure result.

Example 147 is the method of any of Examples 142 to 146, comprising determining to terminate the VNF instance based on a determination that the VNF instance is not providing network services.

Example 148 is the method of any of Examples 142 to 147, the request to contain a VNF instance identifier associated with the VNF instance.

Example 149 is at least one computer-readable storage medium comprising a set of instructions that, in response to being executed on a computing device, cause the computing device to perform a method according to any of Examples 142 to 148.

Example 150 is an apparatus, comprising means for performing a method according to any of Examples 142 to 148.

Example 151 is a system, comprising the apparatus of Example 150, and at least one network interface adapter.

Example 152 is a method, comprising determining to instantiate a virtualized network function (VNF) instance, sending a VNF instantiation request to a network functions virtualization orchestrator (NFVO) to request instantiation of the VNF instance, and determining that instantiation of the VNF instance has been successful based on receipt of a VNF instantiation result notification from the NFVO.

Example 153 is the method of Example 152, the VNF instantiation request to be sent to the NFVO via an Os-Ma-Nfvo reference point.

Example 154 is the method of any of Examples 152 to 153, comprising selecting a VNF descriptor (VNFD) for the VNF instance to be instantiated, determining a VNFD identifier (ID) associated with the selected VNFD, and including the VNFD ID in the VNF instantiation request.

Example 155 is the method of any of Examples 152 to 154, comprising selecting a deployment flavor for the VNF instance to be instantiated, determining a flavor (ID) associated with the selected deployment flavor, and including the flavor ID in the VNF instantiation request.

Example 156 is the method of any of Examples 152 to 155, the VNF instantiation result notification to contain a result parameter, the result parameter to comprise a value indicating successful instantiation of the VNF instance.

Example 157 is the method of any of Examples 152 to 156, the VNF instantiation result notification to contain a VNF instance identifier (ID) associated with the VNF instance.

Example 158 is at least one computer-readable storage medium comprising a set of instructions that, in response to being executed on a computing device, cause the computing device to perform a method according to any of Examples 152 to 157.

Example 159 is an apparatus, comprising means for performing a method according to any of Examples 152 to 157.

Example 160 is a system, comprising the apparatus of Example 159, and at least one network interface adapter.

Example 161 is an apparatus, comprising means for processing an VNF instantiation request received from network manager (NM), means for determining to send a notification indicating that the VNF instantiation has started to network manager (NM), and means for determining to send a notification to NM indicating the result (e.g. success or failure) of VNF instantiation, when the VNF instantiation procedure is completed.

Example 162 is an apparatus, comprising means for determining to terminate a virtualized network function (VNF) instance, means for sending a VNF termination request to a network functions virtualization orchestrator (NFVO) to request termination of the VNF instance, and means for determining that termination of the VNF instance has been successful based on receipt of a VNF termination result notification from the NFVO.

Example 163 is the apparatus of Example 162, the VNF termination request to be sent to the NFVO via an Os-Ma-Nfvo reference point.

Example 164 is the apparatus of any of Examples 162 to 163, comprising means for determining a VNF instance identifier (ID) associated with the VNF instance, and means for including the VNF instance ID in the VNF termination request.

Example 165 is the apparatus of any of Examples 162 to 164, comprising means for setting a termination type parameter of the VNF termination request to a value indicating a request for forceful termination of the VNF instance.

Example 166 is the apparatus of any of Examples 162 to 165, the VNF termination result notification to contain a result parameter, the result parameter to comprise a value indicating successful termination of the VNF instance.

Example 167 is the apparatus of any of Examples 162 to 166, comprising means for determining that the termination of the VNF instance has commenced based on receipt of a VNF termination start notification from the NFVO.

Example 168 is a system, comprising an apparatus according to any of Examples 162 to 167, and at least one network interface adapter.

Example 169 is an apparatus, comprising means for processing an VNF termination request received from network manager (NM), means for determining to send a notification indicating that the VNF termination has started to network manager (NM), and means for determining to send a notification to NM indicating the result (e.g. success or failure) of VNF termination, when the VNF termination procedure is completed.

Example 170 is an apparatus, comprising means for processing an VNF termination request received from element manager (EM), means for determining to send a notification indicating that the VNF termination has started to element manager (EM), and means for determining to send a notification to EM indicating the result (e.g. success or failure) of VNF termination, when the VNF termination procedure is completed.

Example 171 is an apparatus, comprising means for determining to terminate a virtualized network function (VNF) instance, means for sending a VNF termination request to a VNF manager (VNFM) to request termination of the VNF instance, means for determining that termination of the VNF instance has been successful based on receipt of a VNF termination result notification from the VNFM, and means for determining to send a VNF termination result notification to Network Manager (NM).

Example 172 is the apparatus of Example 171, comprising means for determining to terminate the VNF instance based on receipt of a VNF termination request from a network manager (NM).

Example 173 is the apparatus of any of Examples 171 to 172, the VNF termination request to be sent to the VNFM via an Ve-Vnfm-Em reference point.

Example 174 is the apparatus of any of Examples 171 to 173, comprising means for determining a VNF instance identifier (ID) associated with the VNF instance, and means for including the VNF instance ID in the VNF termination request.

Example 175 is the apparatus of any of Examples 171 to 174, comprising means for setting a termination type parameter of the VNF termination request to a value indicating a request for forceful termination of the VNF instance.

Example 176 is the apparatus of any of Examples 171 to 175, the VNF termination result notification to contain a result parameter, the result parameter to comprise a value indicating successful termination of the VNF instance.

Example 177 is the apparatus of any of Examples 171 to 176, comprising means for determining that the termination of the VNF instance has commenced based on receipt of a VNF termination start notification from the VNFM.

Example 178 is a system, comprising an apparatus according to any of Examples 171 to 177, and at least one network interface adapter.

Example 179 is an apparatus, comprising processing circuitry, and computer-readable storage media having stored thereon instructions for execution by the processing circuitry to identify, based on a first message received from an integration reference point manager (IRPManager), a virtualized network function (VNF) instance to be terminated, send a VNF termination request to a virtualized network functions manager (VNFM) to request termination of the VNF instance, determine a VNF instance termination result for the VNF termination request based on a notification received from the VNFM, and send a second message to the IRPManager, the second message to indicate the VNF instance termination result.

Example 180 is the apparatus of Example 179, the computer-readable storage media having stored thereon instructions for execution by the processing circuitry to receive the first message from the IRPManager via an Itf-N reference point, and send the second message to the IRPManager via the Itf-N reference point.

Example 181 is the apparatus of any of Examples 179 to 180, the computer-readable storage media having stored thereon instructions for execution by the processing circuitry to send the VNF termination request to the VNFM via a Ve-Vnfm-Em reference point, and receive the notification from the VNFM via the Ve-Vnfm-Em reference point.

Example 182 is the apparatus of any of Examples 179 to 181, the computer-readable storage media having stored thereon instructions for execution by the processing circuitry to send the second message to the IRPManager while acting as an integration reference point agent (IRPAgent).

Example 183 is the apparatus of any of Examples 179 to 182, the IRPManager to comprise a network manager (NM) entity.

Example 184 is the apparatus of any of Examples 179 to 183, the VNF instance termination result to comprise either a success result or a failure result.

Example 185 is the apparatus of any of Examples 179 to 184, the VNF instance to comprise a VNF instance that is not providing network services.

Example 186 is a system, comprising an apparatus according to any of Examples 179 to 185, and at least one network interface adapter.

Example 187 is an apparatus, comprising processing circuitry, and computer-readable storage media having stored thereon instructions for execution by the processing circuitry to determine to terminate a virtualized network function (VNF) instance of a network including one or more virtualized network functions, send a request to terminate the VNF instance to an element manager (EM), and determine whether the VNF instance has been successfully terminated based on a VNF instance termination result indication received from the EM.

Example 188 is the apparatus of Example 187, the computer-readable storage media having stored thereon instructions for execution by the processing circuitry to send the request to the EM via an Itf-N interface, and receive the VNF instance termination result indication from the EM via the Itf-N interface.

Example 189 is the apparatus of any of Examples 187 to 188, the computer-readable storage media having stored thereon instructions for execution by the processing circuitry to send the request to terminate the VNF instance while acting as an integration reference point manager (IRPManager).

Example 190 is the apparatus of any of Examples 187 to 189, the EM to comprise an integration reference point agent (IRPAgent).

Example 191 is the apparatus of any of Examples 187 to 190, the VNF instance termination result indication to indicate either a success result or a failure result.

Example 192 is the apparatus of any of Examples 187 to 191, the computer-readable storage media having stored thereon instructions for execution by the processing circuitry to determine to terminate the VNF instance based on a determination that the VNF instance is not providing network services.

Example 193 is the apparatus of any of Examples 187 to 192, the request to contain a VNF instance identifier associated with the VNF instance.

Example 194 is a system, comprising an apparatus according to any of Examples 187 to 193, and at least one network interface adapter.

Example 195 is an apparatus, comprising means for identifying, based on a first message received via an Itf-N interface, a virtualized network function (VNF) instance to be terminated, means for sending a VNF termination request via a Ve-Vnfm-Em interface to request termination of the VNF instance, means for determining a VNF instance termination result for the VNF termination request based on a notification received via the Ve-Vnfm-Em interface, and means for sending a second message via the Itf-N interface, the second message to indicate the VNF instance termination result.

Example 196 is the apparatus of Example 195, comprising means for receiving the first message from an integration reference point manager (IRPManager) via the Itf-N interface, and means for sending the second message to the IRPManager via the Itf-N interface.

Example 197 is the apparatus of Example 196, the IRPManager to comprise a network manager (NM) entity.

Example 198 is the apparatus of any of Examples 195 to 197, comprising means for sending the VNF termination request to a virtualized network functions manager (VNFM) via the Ve-Vnfm-Em interface, and means for receiving the notification from the VNFM via the Ve-Vnfm-Em interface.

Example 199 is the apparatus of any of Examples 195 to 198, comprising means for sending the second message via the Itf-N interface while acting as an integration reference point agent (IRPAgent).

Example 200 is the apparatus of any of Examples 195 to 199, the VNF instance termination result to comprise either a success result or a failure result.

Example 201 is the apparatus of any of Examples 195 to 200, the VNF instance to comprise a VNF instance that is not providing network services.

Example 202 is a system, comprising an apparatus according to any of Examples 195 to 201, and at least one network interface adapter.

Example 203 is an apparatus, comprising means for determining to terminate a virtualized network function (VNF) instance of a network including one or more virtualized network functions, means for sending, via an Itf-N reference point, a request to terminate the VNF instance, and means for determining whether the VNF instance has been successfully terminated based on a VNF instance termination result indication received via the Itf-N reference point.

Example 204 is the apparatus of Example 203, comprising means for sending the request to an element manager (EM) via the Itf-N interface, and means for receiving the VNF instance termination result indication from the EM via the Itf-N interface.

Example 205 is the apparatus of Example 204, the EM to comprise an integration reference point agent (IRPAgent).

Example 206 is the apparatus of any of Examples 203 to 205, comprising means for sending the request to terminate the VNF instance while acting as an integration reference point manager (IRPManager).

Example 207 is the apparatus of any of Examples 203 to 206, the VNF instance termination result indication to indicate either a success result or a failure result.

Example 208 is the apparatus of any of Examples 203 to 207, comprising means for determining to terminate the VNF instance based on a determination that the VNF instance is not providing network services.

Example 209 is the apparatus of any of Examples 203 to 208, the request to contain a VNF instance identifier associated with the VNF instance.

Example 210 is a system, comprising an apparatus according to any of Examples 203 to 209, and at least one network interface adapter.

Example 211 is an apparatus, comprising means for determining to instantiate a virtualized network function (VNF) instance, means for sending a VNF instantiation request to a network m functions virtualization orchestrator (NFVO) to request instantiation of the VNF instance, and means for determining that instantiation of the VNF instance has been successful based on receipt of a VNF instantiation result notification from the NFVO.

Example 212 is the apparatus of Example 211, the VNF instantiation request to be sent to the NFVO via an Os-Ma-Nfvo reference point.

Example 213 is the apparatus of any of Examples 211 to 212, comprising means for selecting a VNF descriptor (VNFD) for the VNF instance to be instantiated, means for determining a VNFD identifier (ID) associated with the selected VNFD, and means for including the VNFD ID in the VNF instantiation request.

Example 214 is the apparatus of any of Examples 211 to 213, comprising means for selecting a deployment flavor for the VNF instance to be instantiated, means for determining a flavor (ID) associated with the selected deployment flavor, and means for including the flavor ID in the VNF instantiation request.

Example 215 is the apparatus of any of Examples 211 to 214, the VNF instantiation result notification to contain a result parameter, the result parameter to comprise a value indicating successful instantiation of the VNF instance.

Example 216 is the apparatus of any of Examples 211 to 215, the VNF instantiation result notification to contain a VNF instance identifier (ID) associated with the VNF instance.

Example 217 is a system, comprising an apparatus according to any of Examples 211 to 216, and at least one network interface adapter.

Example 218 is an apparatus, comprising processing circuitry, and computer-readable storage media having stored thereon instructions for execution by the processing circuitry to process an VNF instantiation request received from network manager (NM), determine to send a notification indicating that the VNF instantiation has started to network manager (NM), and determine to send a notification to NM indicating the result (e.g. success or failure) of VNF instantiation, when the VNF instantiation procedure is completed.

Example 219 is an apparatus, comprising processing circuitry, and computer-readable storage media having stored thereon instructions for execution by the processing circuitry to determine to terminate a virtualized network function (VNF) instance, send a VNF termination request to a network functions virtualization orchestrator (NFVO) to request termination of the VNF instance, and determine that termination of the VNF instance has been successful based on receipt of a VNF termination result notification from the NFVO.

Example 220 is the apparatus of Example 219, the VNF termination request to be sent to the NFVO via an Os-Ma-Nfvo reference point.

Example 221 is the apparatus of any of Examples 219 to 220, the computer-readable storage media having stored thereon instructions for execution by the processing circuitry to determine a VNF instance identifier (ID) associated with the VNF instance, and include the VNF instance ID in the VNF termination request.

Example 222 is the apparatus of any of Examples 219 to 221, the computer-readable storage media having stored thereon instructions for execution by the processing circuitry to set a termination type parameter of the VNF termination request to a value indicating a request for forceful termination of the VNF instance.

Example 223 is the apparatus of any of Examples 219 to 222, the VNF termination result notification to contain a result parameter, the result parameter to comprise a value indicating successful termination of the VNF instance.

Example 224 is the apparatus of any of Examples 219 to 223, the computer-readable storage media having stored thereon instructions for execution by the processing circuitry to determine that the termination of the VNF instance has commenced based on receipt of a VNF termination start notification from the NFVO.

Example 225 is a system, comprising an apparatus according to any of Examples 219 to 224, and at least one network interface adapter.

Example 226 is an apparatus, comprising processing circuitry, and computer-readable storage media having stored thereon instructions for execution by the processing circuitry to process an VNF termination request received from network manager (NM), determine to send a notification indicating that the VNF termination has started to network manager (NM), and determine to send a notification to NM indicating the result (e.g. success or failure) of VNF termination, when the VNF termination procedure is completed.

Example 227 is an apparatus, comprising processing circuitry, and computer-readable storage media having stored thereon instructions for execution by the processing circuitry to process an VNF termination request received from element manager (EM), determine to send a notification indicating that the VNF termination has started to element manager (EM), and determine to send a notification to EM indicating the result (e.g. success or failure) of VNF termination, when the VNF termination procedure is completed.

Example 228 is an apparatus, comprising processing circuitry, and computer-readable storage media having stored thereon instructions for execution by the processing circuitry to determine to terminate a virtualized network function (VNF) instance, send a VNF termination request to a VNF manager (VNFM) to request termination of the VNF instance, determine that termination of the VNF instance has been successful based on receipt of a VNF termination result notification from the VNFM, and determine to send a VNF termination result notification to Network Manager (NM).

Example 229 is the apparatus of Example 228, the computer-readable storage media having stored thereon instructions for execution by the processing circuitry to determine to terminate the VNF instance based on receipt of a VNF termination request from a network manager (NM).

Example 230 is the apparatus of any of Examples 228 to 229, the VNF termination request to be sent to the VNFM via an Ve-Vnfm-Em reference point.

Example 231 is the apparatus of any of Examples 228 to 230, the computer-readable storage media having stored thereon instructions for execution by the processing circuitry to determine a VNF instance identifier (ID) associated with the VNF instance, and include the VNF instance ID in the VNF termination request.

Example 232 is the apparatus of any of Examples 228 to 231, the computer-readable storage media having stored thereon instructions for execution by the processing circuitry to set a termination type parameter of the VNF termination request to a value indicating a request for forceful termination of the VNF instance.

Example 233 is the apparatus of any of Examples 228 to 232, the VNF termination result notification to contain a result parameter, the result parameter to comprise a value indicating successful termination of the VNF instance.

Example 234 is the apparatus of any of Examples 228 to 233, the computer-readable storage media having stored thereon instructions for execution by the processing circuitry to determine that the termination of the VNF instance has commenced based on receipt of a VNF termination start notification from the VNFM.

Example 235 is a system, comprising an apparatus according to any of Examples 228 to 234, and at least one network interface adapter.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended zo claims is not necessarily limited to the specific features or acts described above. Rather, the specific features and acts described above are disclosed as example forms of implementing the claims.

What is claimed is:

1. At least one computer-readable storage medium comprising a set of instructions that, in response to being executed on a computing device, cause the computing device to:
   identify, based on a first message received from an integration reference point manager (IRPManager) via an Itf-N interface, a virtualized network function (VNF) instance to be terminated;
   send a VNF termination request to a virtualized network functions manager (VNFM) to request termination of the VNF instance;
   determine a VNF instance termination result for the VNF termination request based on a notification received from the VNFM; and
   send a second message to the IRPManager via the Itf-N interface, the second message to indicate the VNF instance termination result.

2. The at least one computer-readable storage medium of claim 1, comprising instructions that, in response to being executed on the computing device, cause the computing device to:
   send the VNF termination request to the VNFM via a Ve-Vnfm-Em reference point; and
   receive the notification from the VNFM via the Ve-Vnfm-Em reference point.

3. The at least one computer-readable storage medium of claim 1, comprising instructions that, in response to being executed on the computing device, cause the computing device to send the second message to the IRPManager while acting as an integration reference point agent (IRPAgent).

4. The at least one computer-readable storage medium of claim 1, wherein a network manager (NM) entity acts as the IRPManager.

5. The at least one computer-readable storage medium of claim 1, the VNF instance termination result to comprise either a success result or a failure result.

6. The at least one computer-readable storage medium of claim 1, the VNF instance to comprise a VNF instance that is not providing network services.

7. At least one computer-readable storage medium comprising a set of instructions that, in response to being executed on a computing device, cause the computing device to:
   determine to terminate a virtualized network function (VNF) instance of a network including one or more virtualized network functions;
   send a request to terminate the VNF instance to an element manager (EM) via an Itf-N interface; and
   determine whether the VNF instance has been successfully terminated based on a VNF instance termination result indication received from the EM via the Itf-N interface.

8. The at least one computer-readable storage medium of claim 7, comprising instructions that, in response to being executed on the computing device, cause the computing device to send the request to terminate the VNF instance while acting as an integration reference point manager (IRPManager).

9. The at least one computer-readable storage medium of claim 7, the EM to comprise an integration reference point agent (IRPAgent).

10. The at least one computer-readable storage medium of claim 7, the VNF instance termination result indication to indicate either a success result or a failure result.

11. The at least one computer-readable storage medium of claim 7, comprising instructions that, in response to being executed on the computing device, cause the computing device to determine to terminate the VNF instance based on a determination that the VNF instance is not providing network services.

12. The at least one computer-readable storage medium of claim 7, the request to contain a VNF instance identifier associated with the VNF instance.

13. An apparatus, comprising: processing circuitry; and computer-readable storage media having stored thereon instructions for execution by the processing circuitry to:
identify, based on a first message received via an Itf-N interface, a virtualized network function (VNF) instance to be terminated;
send a VNF termination request via a Ve-Vnfm-Em interface to request termination of the VNF instance;
determine a VNF instance termination result for the VNF termination request based on a notification received via the Ve-Vnfm-Em interface; and
send a second message via the Itf-N interface to an integration reference point manager (IRPManager), the second message to indicate the VNF instance termination result.

14. The apparatus of claim 13, the instructions for execution by the processing circuitry to:
receive the first message from the IRPManager via the Itf-N interface.

15. The apparatus of claim 13, wherein a network manager (NM) entity acts as the IRPManager.

16. The apparatus of claim 13, the instructions for execution by the processing circuitry to:
send the VNF termination request to a virtualized network functions manager (VNFM) via the Ve-Vnfm-Em interface; and
receive the notification from the VNFM via the Ve-Vnfm-Em interface.

17. The apparatus of claim 13, the instructions for execution by the processing circuitry to send the second message via the Itf-N interface to the IRPManager while acting as an integration reference point agent (IRPAgent).

18. The apparatus of claim 13, the VNF instance termination result to comprise either a success result or a failure result.

19. The apparatus of claim 13, the VNF instance to comprise a VNF instance that is not providing network services.

20. A system, comprising:
the apparatus according to claim 13; and at least one network interface adapter.

21. An apparatus, comprising: processing circuitry; and computer-readable storage media having stored thereon instructions for execution by the processing circuitry to:
determine to terminate a virtualized network function (VNF) instance of a network including one or more virtualized network functions;
send, via an Itf-N interface, a request to terminate the VNF instance; and
determine whether the VNF instance has been successfully terminated based on a VNF instance termination result indication received via the Itf-N interface.

22. The apparatus of claim 21, the instructions for execution by the processing circuitry to:
send the request to an element manager (EM) via the Itf-N interface; and
receive the VNF instance termination result indication from the EM via the Itf-N interface.

23. The apparatus of claim 22, the EM to comprise an integration reference point agent (IRPAgent).

24. The apparatus of claim 21, the instructions for execution by the processing circuitry to send the request to terminate the VNF instance while acting as an integration reference point manager (IRPManager).

25. The apparatus of claim 21, the VNF instance termination result indication to indicate either a success result or a failure result.

26. The apparatus of claim 21, the instructions for execution by the processing circuitry to determine to terminate the VNF instance based on a determination that the VNF instance is not providing network services.

27. The apparatus of claim 21, the request to contain a VNF instance identifier associated with the VNF instance.

28. A system, comprising:
the apparatus according to claim 21; and
at least one network interface adapter.

* * * * *